United States Patent [19]
Haskell et al.

[11] Patent Number: 5,742,343
[45] Date of Patent: Apr. 21, 1998

[54] SCALABLE ENCODING AND DECODING OF HIGH-RESOLUTION PROGRESSIVE VIDEO

[75] Inventors: Barin Geoffry Haskell, Tinton Falls, N.J.; Atul Puri, Riverdale, N.Y.

[73] Assignee: Lucent Technologies Inc., Murray Hill, N.J.

[21] Appl. No.: 699,221

[22] Filed: Aug. 19, 1996

Related U.S. Application Data

[63] Continuation of Ser. No. 91,144, Jul. 13, 1993, abandoned.

[51] Int. Cl.$^6$ .............................. H04N 7/12; H04N 11/02; H04N 11/04

[52] U.S. Cl. .......................... 348/415; 348/401; 348/430; 348/437; 348/487; 348/389

[58] Field of Search ..................... 348/400–402, 348/409, 415, 416, 426, 427, 430–432, 437, 441, 443, 445–448, 452, 458, 549, 469, 487, 388, 389; H04N 7/12, 11/02, 11/04

[56] References Cited

U.S. PATENT DOCUMENTS

| | | | |
|---|---|---|---|
| 5,055,927 | 10/1991 | Kessen et al. | 348/437 |
| 5,128,791 | 7/1992 | Le Gall et al. | 348/426 |
| 5,196,933 | 3/1993 | Henot | 348/419 |
| 5,231,384 | 7/1993 | Kuriacose | 348/426 |
| 5,253,058 | 10/1993 | Gharavi | 348/415 |
| 5,387,940 | 2/1995 | Kwok et al. | 348/415 |
| 5,408,270 | 4/1995 | Lim | 348/432 |
| 5,410,354 | 4/1995 | Uz | 348/426 |
| 5,418,571 | 5/1995 | Ghanbari | 348/409 |

OTHER PUBLICATIONS

A. Puri, "Video Coding Using the MPEG–1 Compression Standard," Society for Information Display: International Symposium, Boston, May 1992.

A. Puri, Y. Wang & B.G. Haskell, "Simplified Interlace–Interlace Conversion,". ISO/IECJTC1/SC29/WGH Doc. MPEG 93/143, Rome, Jan. 1993.

A. Puri, "Picture Format Scalable Coding for HDTV," ISO/IECJTC1/SC29/WG11 Doc. MPEG 93/390, Sydney, Mar. 1993.

Test Model Editing Committee, "MPEG–2 Video Test Model 5," ISO/IEC JTC1/SC29/WG11 Doc. No. 400, Apr. 1993.

ISO/IECJTC1/SC29/WG11, "Generic Coding of Moving Pictures and Associated Audio," MPEG–2 Video Working Draft, May 1993.

Advisory Committee on Advanced Television Service, "HDTV Grand Alliance Proposal Press Release," FCC Advisory Committee, May 1993.

N. Hurst, "Interlace to Progressive Migration fo the Transmission Path," Post meeting notes submitted to FCC Advisory Committee, Jun. 1993.

A. Puri, A. Wong & D. Anastassiou, "Flexible Spatial Scalability Syntax and Weighted Spatio–Temporal Prediction," ISO/IECJTC1/SC29/WG11 MPEG 92/506, Sep. 1992, Tarrytown.

*Primary Examiner*—John K. Peng
*Assistant Examiner*—John W. Miller

[57] ABSTRACT

High-resolution, progressive format video signals having high frame rates may be encoded by a base layer encoder and an enhancement layer encoder to provide two kinds of encoded video signals which share a common output channel. These encoded video signals are received at an input of a video receiver which may use one or both of the two kinds of encoded video signal. Relatively lower performance high-definition televisions may thus receive video signals from higher performance transmitters and produce satisfactory pictures. Higher performance HDTVs will be able to utilize the full performance capabilities of these video signals.

29 Claims, 31 Drawing Sheets

SCALABLE ENCODING AND DECODING OF HIGH-RESOLUTION PROGRESSIVE VIDEO

This is a Continuation of application Ser. No. 08/091,144 filed Jul. 13, 1993 now abandoned.

TECHNICAL FIELD

This invention relates to encoding and decoding of video signals. More particularly, this invention relates to multi-level encoding and decoding of high-resolution video signals, such as high-definition television (HDTV) signals.

BACKGROUND

The Federal Communications Commission (FCC) now has before it several different proposals regarding standardization of high-definition television (HDTV) systems. These proposals envision a short-term solution to the problem of standardization involving both interlaced format video and reduced resolution progressively scanned video. For example, these proposals involve interlaced format video comprising a full 1,050 horizontal lines of picture elements (pels) per frame (960 active lines), progressive format video comprising 787.5 horizontal lines of pels per frame (720 active lines) at frame rates of 60 Hz, 30 Hz, or 24 Hz, and progressive format video comprising 1,050 horizontal lines of pels per frame (960 active lines) at a frame rate of 30 Hz or 24 Hz. At some unspecified time in the future, HDTV standards are expected to migrate to a full resolution progressively scanned format. For example, it is expected that HDTV standards may evolve to a progressive format video comprising a full 1,050 horizontal lines of pels at a full 60 Hz frame rate. In the meantime, it is expected that a large amount of expensive, relatively low capability HDTV equipment will be made and sold which will use the early low-capability standards. It will be necessary for any high-capability future HDTV standards to permit reception of reasonable pictures on these earlier low-capability systems.

SUMMARY

During the transition period from the short-term systems to the later higher performance implementations, it will be necessary for older HDTV sets to receive the new signals and display reasonably good-looking pictures from those signals. An advantageous way to provide for this capability is through a technique of scalable coding of high resolution progressive format video signals whereby a base layer of coding and an enhancement layer of coding are combined to form a new encoded video signal. Older HDTVs will discard the enhancement layer and derive their pictures only from the base layer, which is made compatible with the initial short-term FCC standards. Newer HDTVs will be able to utilize both of the base layer and the enhancement layer to derive high-resolution, high-frame rate, and progressive format pictures.

In a specific example of this invention, a multi-layer video encoder comprises an input for receiving high-resolution, high-frame rate, progressive format video signals. A base layer encoder is responsive to the input for producing in a predetermined format encoded video signals having a predetermined resolution and a predetermined frame rate. An enhancement layer encoder is also responsive to the input for producing encoded video input signals at a predetermined frame rate in a predetermined format at a predetermined resolution level.

Other aspects of certain examples of this invention include achieving migration to a high frame rate, such as 60 Hz, progressive format in a manner compatible with HDTVs having lesser capabilities, various codec configurations representing complexity and cost tradeoffs, adaptive channel sharing for better overall picture quality for a given bandwidth, and adaptive progressive to interlace conversion to maintain resolution and prevent aliasing.

The discussion in this Summary and the following Brief Description of the Drawings, Detailed Description, and drawings merely represents examples of this invention and is not to be considered in any way a limitation on the scope of the exclusionary rights conferred by a patent which may issue from this application. The scope of such exclusionary rights is set forth in the claims at the end of this application.

Figure 1:
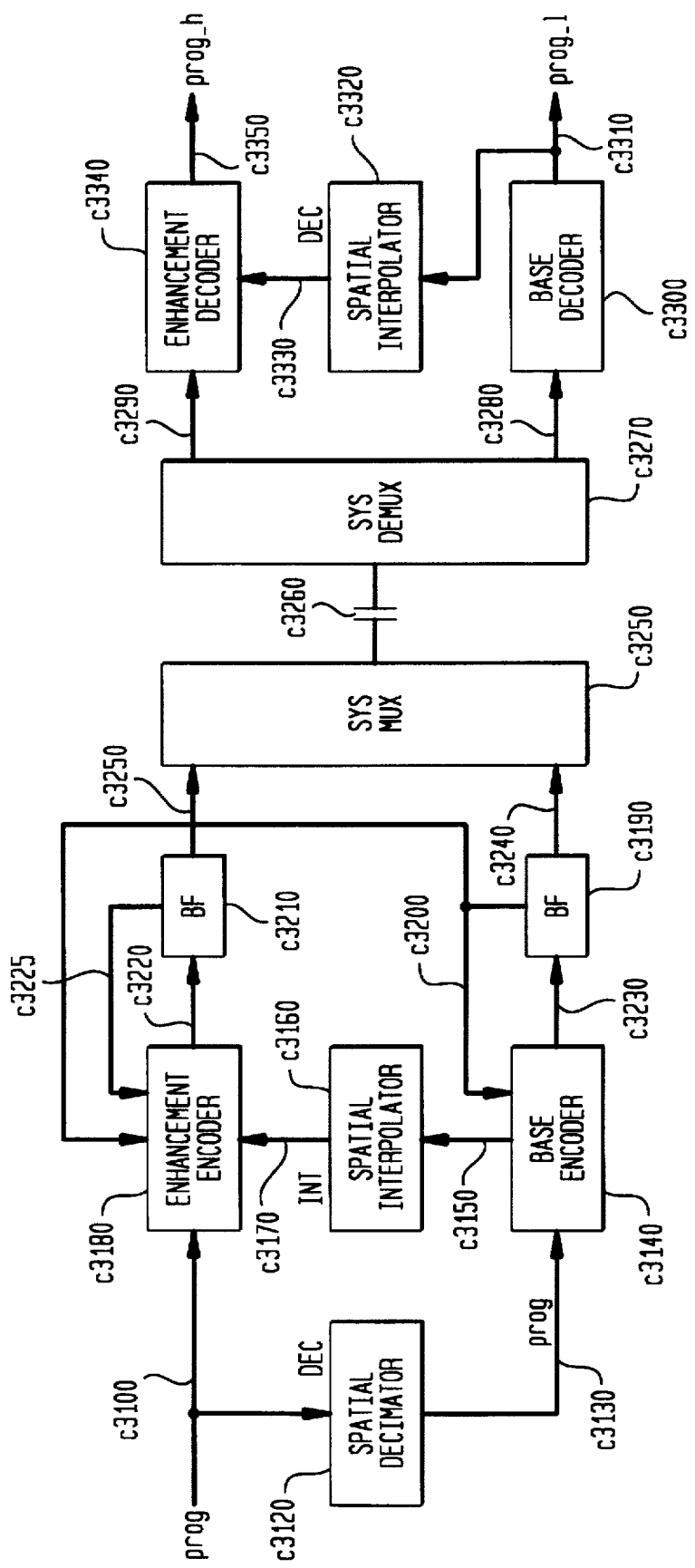
FIG. 1 is a block diagram of a two layer video codec with base layer progressive, enhancement layer progressive, and adaptive channel sharing, arranged in accordance with the principles of this invention.

The following abbreviations have been used in the drawings listed above:

prog—progressive video
interl—interlaced video
MC—Motion Compensation
ME—Motion Estimation
mv—motion vectors
T—Transform (e.g. a Discrete Cosine Transform [DCT])
IT—Inverse Transform (e.g. an Inverse Discrete Cosine Transform [IDCT])
Q—Quantizer
IQ—Inverse Quantizer
QA—Quantizer Adapter
qs—quantizer step size
VE—Variable Length Encoder
VD—Variable Length Decoder
WT—Weighter (generalized switch)
PS—Previous Picture Store
NS—Next Picture Store
XS—Extra Picture Store
YS—Extra Picture Store
SW—Switch
BF—Buffer

DETAILED DESCRIPTION

FIG. 1 shows an illustrative spatially scalable system in accordance with this invention using a base layer consisting of lower resolution, progressive television. In this scenario, current FCC plans call for a base layer active video of 1280 pels, 720 scan lines, 60 Hz frame rate, 1:1 progressive. The video input is at the same frame rate, but has a higher resolution. For example, one plan calls for up to 1920 pels, 960 lines, 60 Hz, 1:1 progressive. Another plan calls for up to 1920 pels, 1080 lines, 60 Hz, 1:1 progressive.

Such progressive high resolution video enters the circuit of C3 on bus c3100 and passes to a spatial decimator c3120, where it may be low-pass filtered before reducing the number of pels to a lower base-layer resolution. The decimated base layer video is then output on bus c3130 and passes to a base encoder c3140, which outputs a typically variable bit-rate coded bit-stream on bus c3230.

Base encoder c3140 also outputs a replica decoded base layer video signal on bus c3150, which passes to a spatial interpolator c3160. Spatial interpolator c3160 increases the number of pels per frame using any interpolation method well known in the art. This "upsampled" video is output on bus c3170 and passes to an enhancement encoder c3180, which outputs a typically variable bit-rate coded bit-stream on bus c3250.

Enhancement encoder c3180 utilizes the upsampled video on bus c3170 as a prediction, in order to increase the efficiency of coding the full resolution progressive video input on bus c3100. An example of such encoding is described below.

The two variable-rate bit-streams on buses c3230 and c3220 pass to buffers c3190 and c3210, respectively. Typically, bits are read out of the buffers at a different instantaneous rate than 4 bits are written into the buffers. Because of this, there is the possibility that overflow or underflow might occur. To alleviate this possibility buffer c3190 outputs a fullness signal on bus c3200, and buffer c3210 outputs a fullness signal on bus c3225.

The fullness of buffer c3190 appearing on bus c3200 passes to both the base encoder c3140 and the enhancement encoder c3180. Base encoder c3140 utilizes this fullness signal to control the data flow into Buffer c3190 according to any method of controlling data flow well known in the art.

The fullness signal from buffer c3210 appearing on bus c3225 passes to enhancement encoder c3180. In many scalable implementations, the coded picture quality of the base layer will be the overriding consideration in allocating bit-rate to the enhancement layer. In fact, the coding efficiency of the enhancement encoder usually depends on a high quality base layer picture. For these reasons, enhancement encoder c3180 utilizes both buffer fullness signals in controlling the data flow into buffer c3210. For example, it may utilize the sum of the two fullnesses. Also, for example, if at any time Buffer c3190 were deemed too full, then enhancement encoder c3180 could cease producing data altogether for the enhancement layer, thereby allocating the entire transmission bit-rate to the base layer.

Data is read out of Buffers c3190 and c3210 on buses c3240 and c3250, respectively, under control of Systems Multiplexer c3250, which typically combines the two bit-streams in preparation for transmission on Channel c3260. Alternatively, the two bit-streams could be sent on two separate and independent channels.

If the two bit-streams are multiplexed, then systems demultiplexer c3270 at the receiver separates them apart again and outputs them on buses c3290 and c3280. In the absence of transmission errors, the bit-stream on bus c3250 appears on bus c3290 and the bit-stream on bus c3240 appears on bus c3280.

The two bit-streams on buses c3290 and c3280 enter an enhancement decoder c3340 and a base decoder c3300, respectively. Base decoder c3300 produces a base layer video signal on bus c3310, which, in the absence of transmission errors, is exactly the same as the replica decoded video on bus c3150.

The decoded base layer video on bus c3310 also passes to spatial interpolator c3320, which is a duplicate of the interpolator c3150 and which produces an upsampled video on bus c3330. In the absence of transmission errors, the upsampled video on buses c3330 and c3170 are identical. Enhancement decoder c3340 utilizes the upsampled video on bus c3330 in conjunction with the enhancement layer bit-stream on bus c3290 to produce a decoded full resolution, progressive video on bus c3350. A detailed example of such decoding is described below.

Figure 2:
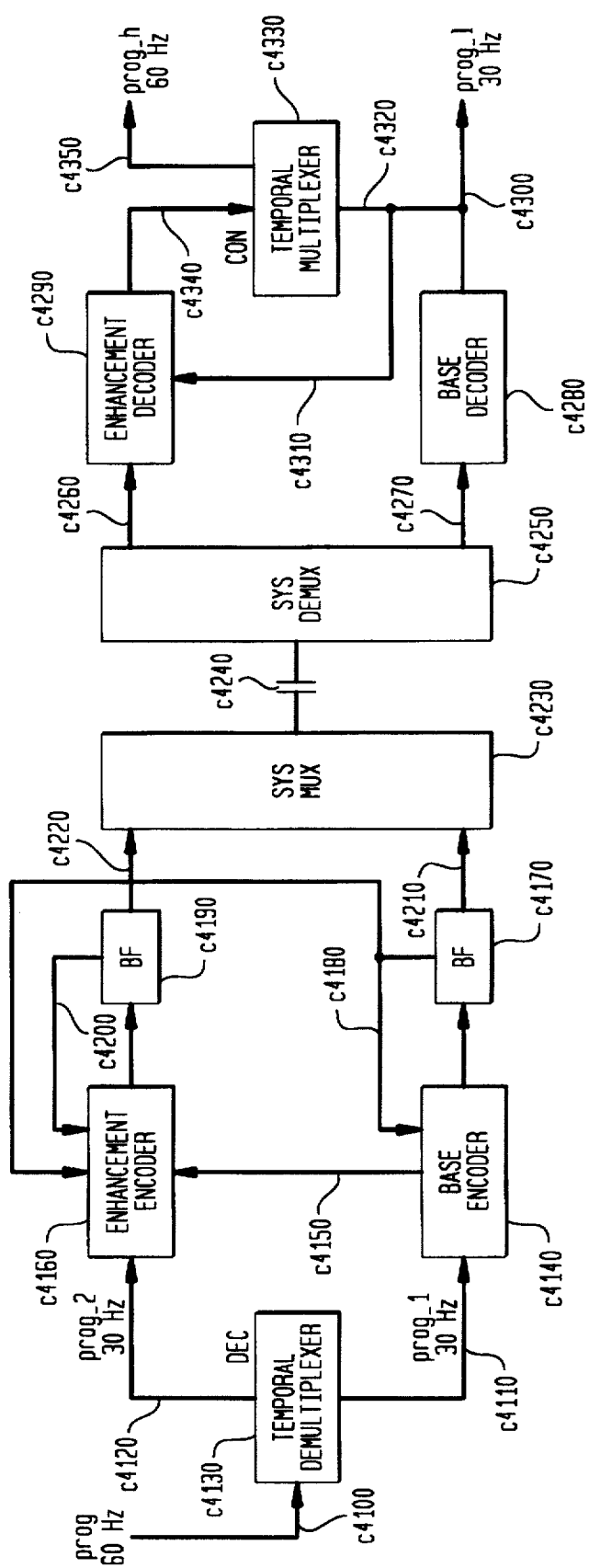
FIG. 2 is a block diagram of a two layer video codec with base layer progressive, enhancement layer progressive, and adaptive channel sharing, arranged in accordance with the principles of this invention.

FIG. 2 shows another version of the invention where the base layer comprises a progressive video signal at full resolution, but at half the frame rate of the original. Current FCC plans call for a "film" mode of perhaps up to 1920 pels, 1080 lines, 30 Hz frame rate, 1:1 progressive. The system of FIG. 2 comprises a temporal demultiplexer c4130 which is a simple switching mechanism that routes alternate frames of progressive input video to output buses c4120 and c4110.

A base encoder c4140 may operate in essentially the same way as the base encoder C3140 in FIG. 1, except that it codes full resolution video at half the frame rate. A replica decoded base layer video is output on bus c4150 that is full resolution. Thus, there is no need for upsampling prior to delivery to an enhancement encoder c4160.

The enhancement encoder c4160 operates in exactly the same way as the enhancement encoder C3180 in FIG. 1. However, in this case the prediction picture on bus c4150 is temporally shifted from the video frames on bus c4120 that are to be encoded. For this reason a simple coding of the difference is not the most efficient method. An example, encoding is described below.

The remaining operations of the encoding, multiplexing, demultiplexing and base decoding are identical to those of FIG. 1. In the absence of transmission errors, the decoded base layer video on buses c4300, c4310 and c4320 is identical to the replica decoded video on bus c4150.

An enhancement decoder c4290 produces a full resolution, half frame-rate video on bus c4340. These frames occur temporally at times half way between the frame times of the base layer video on bus c4320. The details of an example of such decoding is described below.

A temporal multiplexor c4330 may comprise a simple switching mechanism that alternately feeds the frames on busses c4320 and c4340 to the output bus c4350 to provide a full resolution, full frame rate, progressive video.

Figure 3:
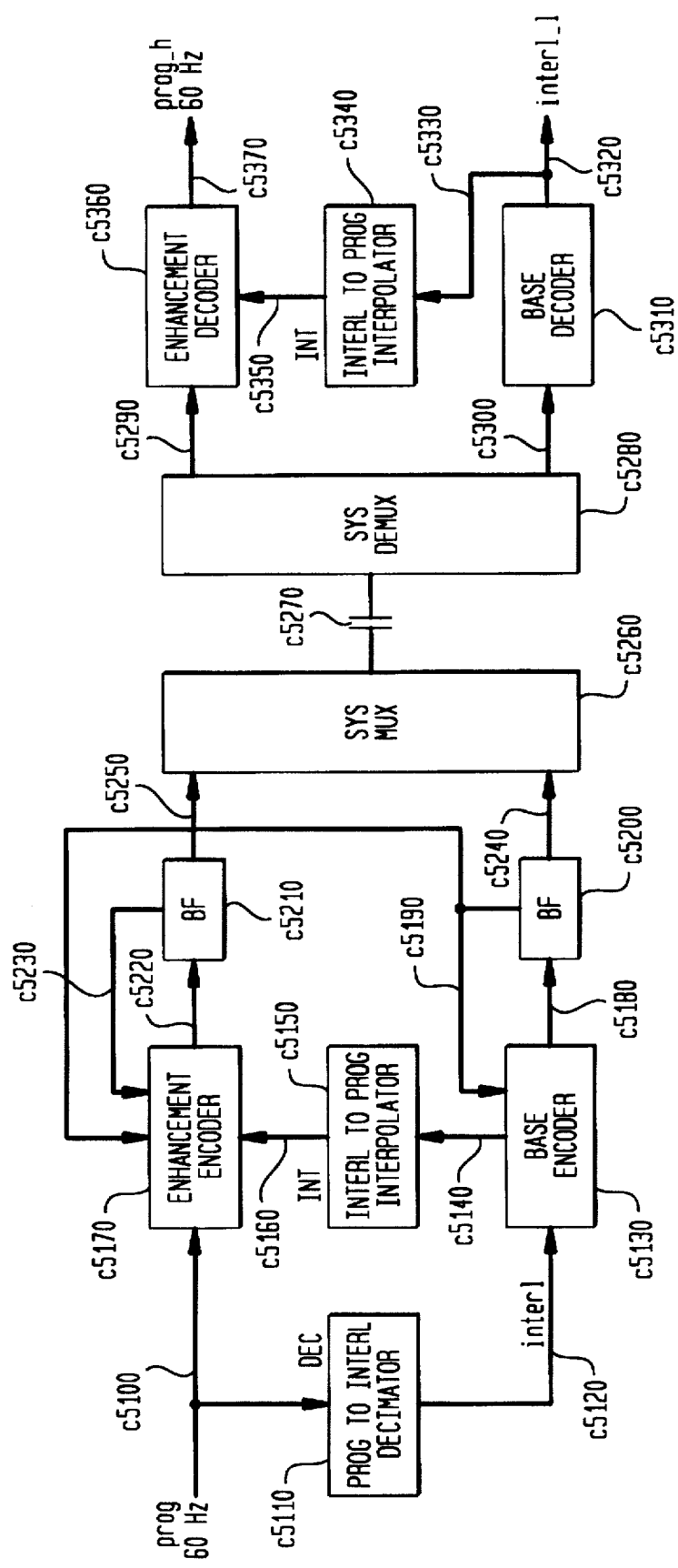
FIG. 3 is a block diagram of a two layer video codec with base layer interlaced, enhancement layer progressive, and adaptive channel sharing, arranged in accordance with the invention.

FIG. 3 shows another example of the invention where the base layer comprises an interlaced signal at full resolution, but at half the frame rate of the original progressive input. Current FCC plans call for an interlace mode of perhaps up to 1920 pels, 1080 lines, 30 Hz frame rate, 2:1 interlaced. Progressive-to-interlace-decimator c5110 converts each pair of progressive frames on bus c5100 to a single interlaced frame and outputs the result on bus c5120. Apparatus and methods for converting progressive format video to interlace format video are described below.

A base encoder c5130 operates in exactly the same way as the base encoder C3140 in FIG. 1, except that it codes full resolution interlaced video at half the frame rate. A replica decoded base layer video is output on bus c5140 that is full resolution, interlaced.

Interlace-to-progressive interpolator c5150 converts each replica decoded interlaced frame input from bus c5140 into two progressive frames in a manner to be described below. The resulting upsampled progressive video is output on bus c5160 and fed to an enhancement encoder c5170. Enhancement encoder c5170 operates in exactly the same way as the enhancement encoder C3180 in FIG. 1.

The remaining operations of encoding, multiplexing, demultiplexing and base decoding are identical to those corresponding operations of FIG. 1. In the absence of transmission errors, the decoded base layer video on buses c5320 and c5330 is identical to the replica decoded video on bus c5140. Interlace-to-progressive interpolator C5340, which is identical to that of element c5150, upsamples the interlaced video on bus c5330 and produces on bus c5350 a full resolution, full frame rate, progressive video that, in the absence of transmission errors, is identical to the video on bus c5160.

Enhancement decoder c5360 utilizes the upsampled video on bus c5350 in conjunction with the enhancement layer bit-stream on bus c5290 to produce a decoded full resolution, full frame rate, progressive video on bus c5370. An example of such decoding is described in detail below.

Figure 4:
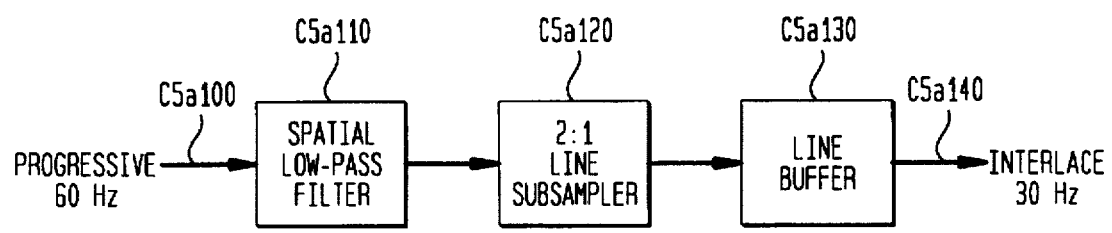
FIG. 4 is a block diagram of a progressive to interlaced decimator.

In converting from a progressive scanned television signal containing, for example, 60 complete frames per second to an interlaced signal containing 30 frames per second, a fixed spatial-low-pass filter may be used on each progressive frame, as shown in FIG. 4. Following the filtering operation of a filter C5a110, each pair of progressive frames is converted to an interlaced frame by taking the odd numbered TV lines from the first frame of the progressive pair and the even numbered TV lines from the second frame of the progressive pair. This is accomplished by a subsampler C5a120, which discards alternate TV lines of each progressive frame. Following the subsampling operation, a line Buffer C5a130 serves to stretch the duration of each retained scan TV line by a factor of two to meet the timing requirements of the resulting interlaced video signal, which is output on bus C5a140. Although the buffer c5a140 is shown in FIG. 4 as a separate item, it may be incorporated into the operation of the base encoder that follows.

Figure 35:
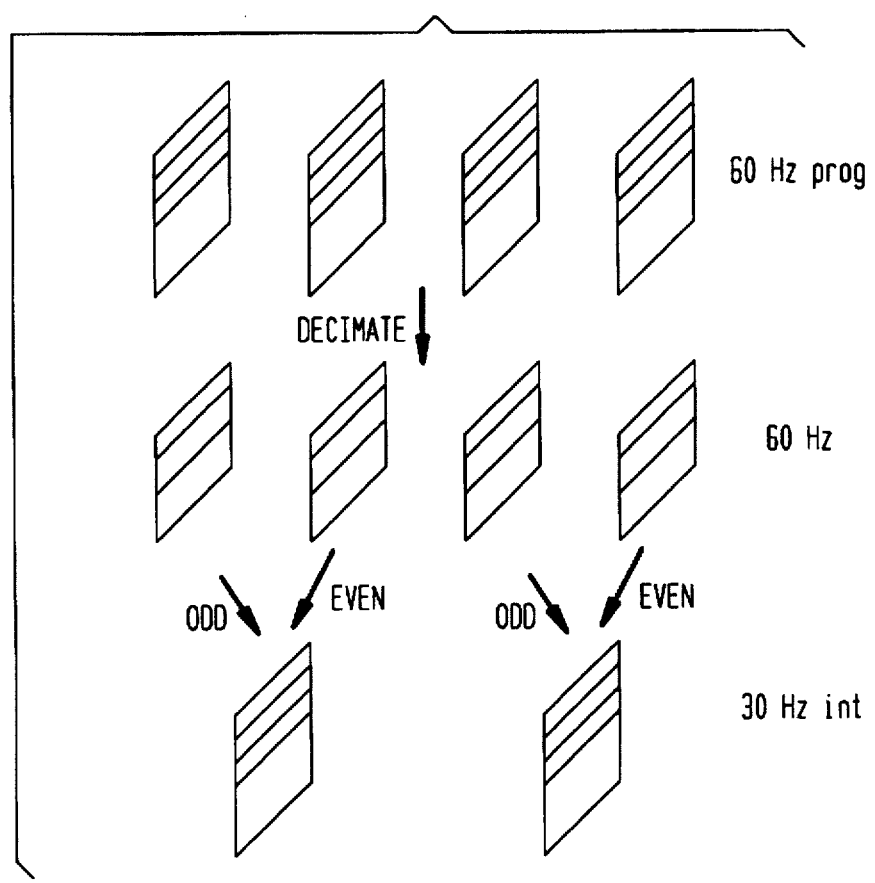
FIG. 35 shows progressive to interlace conversion, in accordance with this invention.
Figure 36:
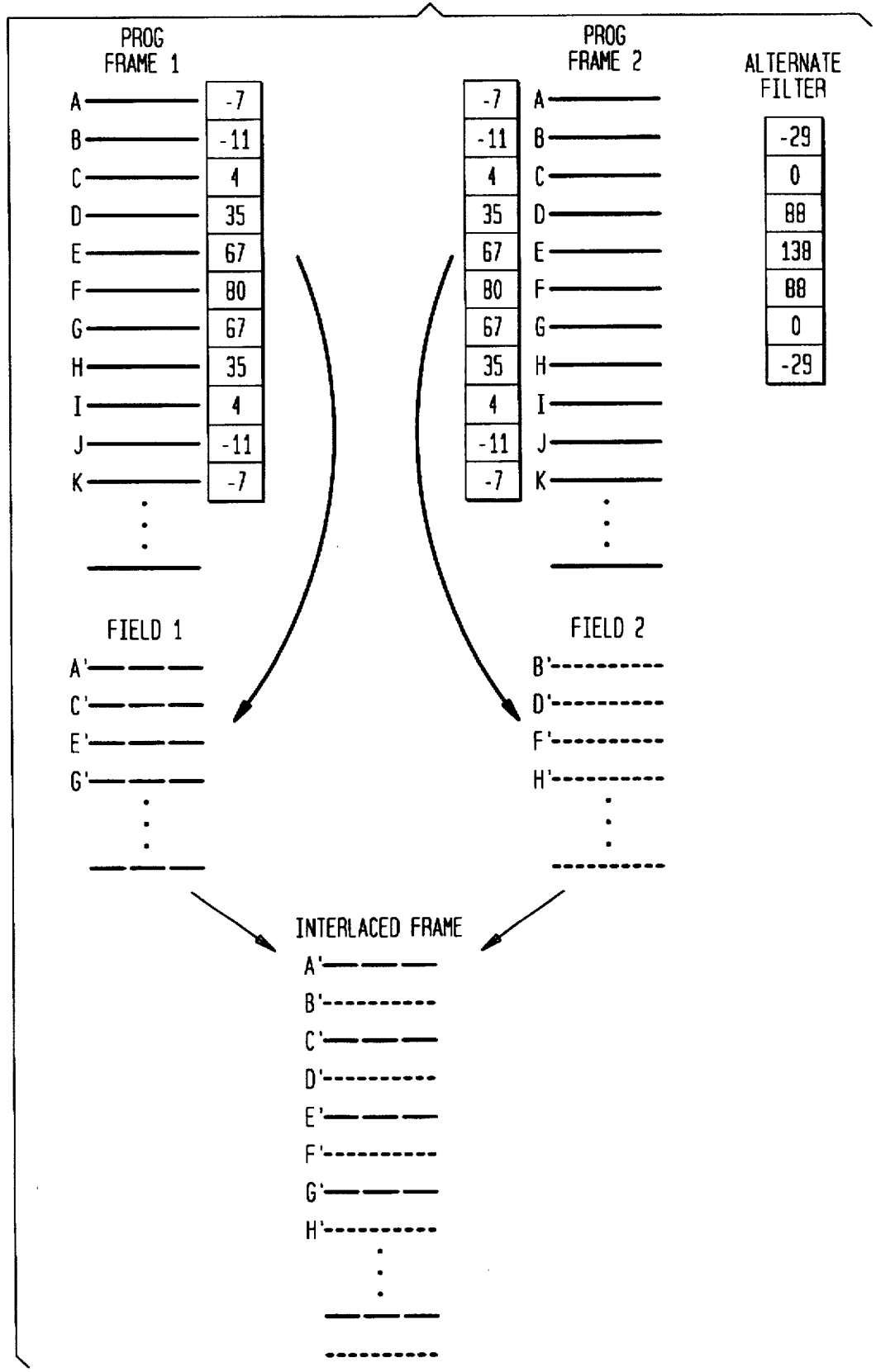
FIG. 36 shows the operation of decimation for progressive to interlace conversion, arranged in accordance with this invention.

The line subsampling operation is shown graphically in FIG. 35. The spatial filtering is normally employed only in the vertical dimension of each video frame. The combined filtering/subsampling operation is shown graphically in FIG. 36. Here, an example 11-tap vertical filter is applied to each progressive video frame. The first filtered frame of each progressive pair is subsampled vertically to form the first field of the interlaced video frame. Similarly, the second frame of each progressive pair becomes the second field of the interlaced frame. Also, shown in FIG. 36 for illustration is an example of a 7-tap vertical filter.

Figure 37:
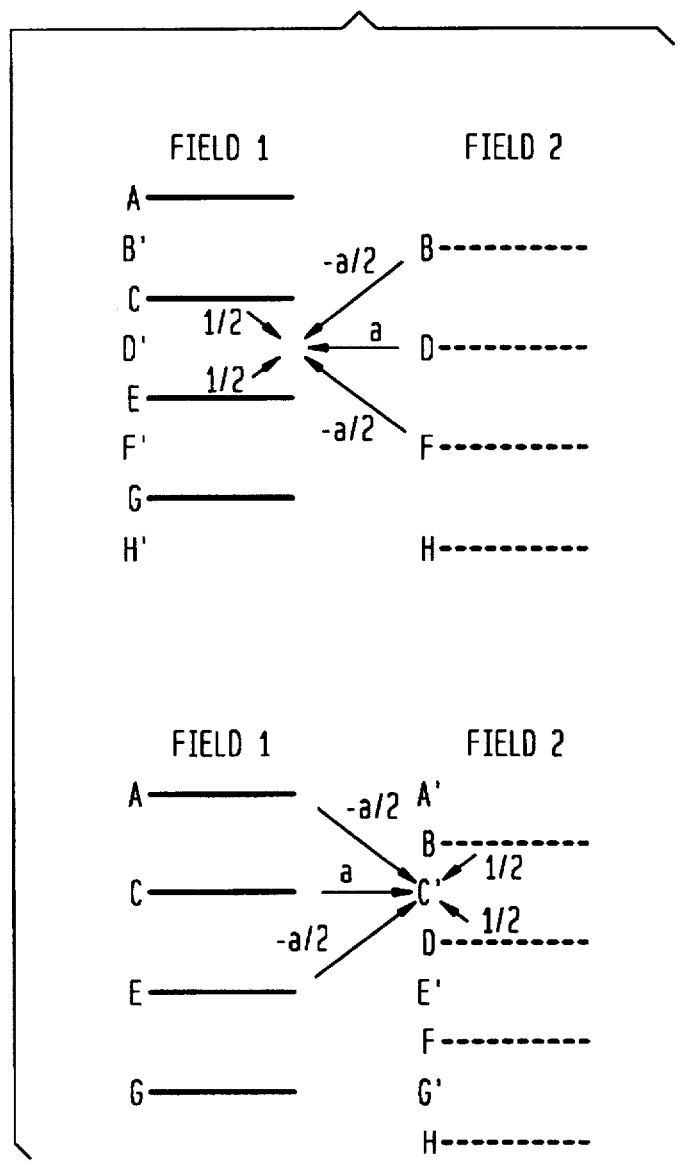
FIG. 37 shows the operation of interpolation for interlace to progressive conversion, arranged in accordance with this invention.

The operation of interlace-to-progressive interpolator c5340 is shown graphically in FIG. 37. Construction of the first frame of each progressive pair is shown at the top. Lines A,C,G, . . . exist in interlaced field 1, and lines B,D,F, . . . exist in interlaced field 2. interpolation to obtain missing line D of the progressive frame is shown as D=(C+E+2aD−aB−aF)/2, where typically 0<a<1. For the second frame of each progressive pair a similar interpolation produces missing line C.

The low-pass spatial filter CSa110 is needed to alleviate line flicker when displaying the interlaced frames on an interlaced display. The effect of the low-pass spatial filter is to significantly reduce the resolution by blurring, the visual information in the progressive frames. While this blurring is necessary to reduce line flicker in moving areas of the picture, it is unnecessary in stationary areas. Since text and computer graphics are often displayed without motion, they are particularly penalized by the low-pass spatial filter.

Figure 5:
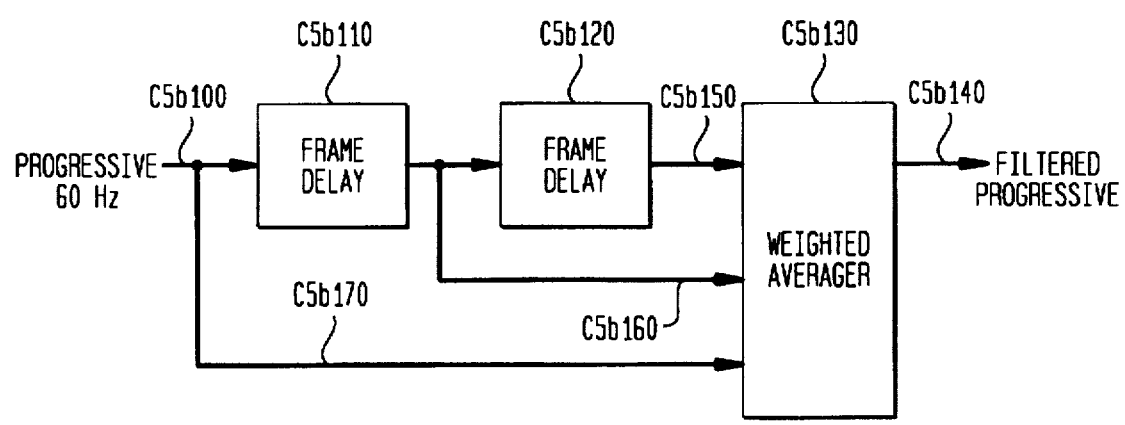
FIG. 5 is a block diagram of a spatio-temporal low-pass filter.

A solution to this dilemma is to use an adaptive spario-temporal low-pass filter that blurs only the moving parts of the picture and leaves the stationary parts at full resolution. One simple example is a three-tap finite-impulse-response (FIR) temporal filter. Such a filter is shown in FIG. 5, where two progressive frame delays are used to form a weighted average of three progressive frames prior to TV line subsampling. Weighted averager C5b130 in a non-adaptive arrangement may apply a weight W, where 0<W<1, to the signal on line C5b160 corresponding to the middle frame, and a weight (1−W)/2 to each of the signals on lines C5b150 and C5b170 corresponding to the remaining two frames. This weighting is followed by a summation of the three weighted signals to form the filtered progressive video signal output on bus C5b140.

Figure 6:
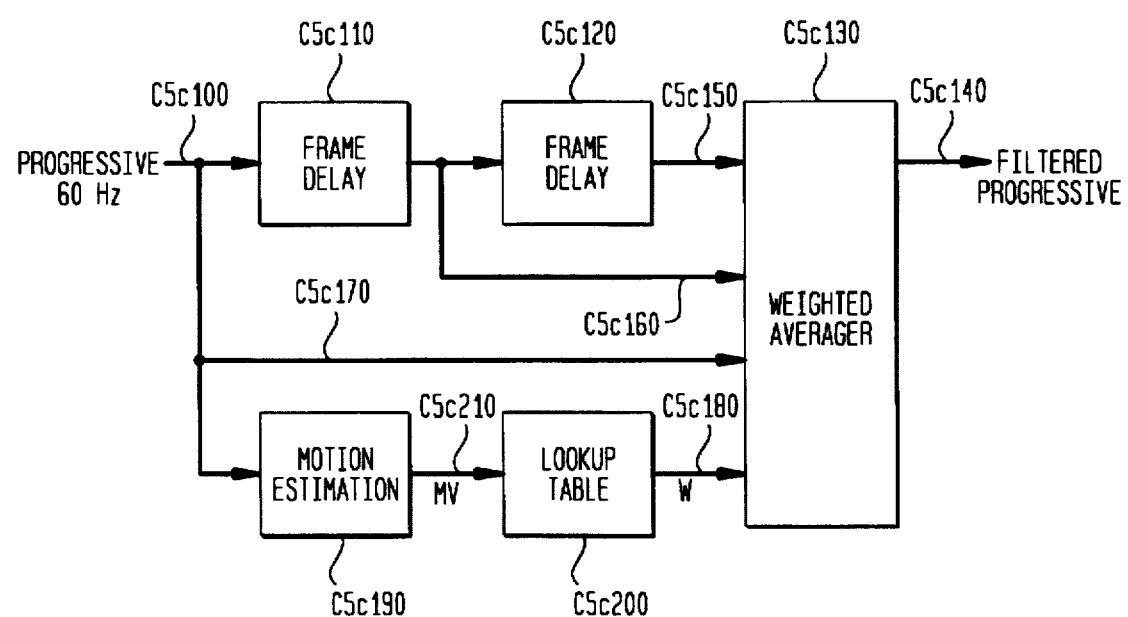
FIG. 6 is a block diagram of a motion adaptive spatio-temporal low-pass filter.

If the motion is moderate to rapid, blurring may be introduced by such a nonadaptive temporal filtering. FIG. 6 shows a motion adaptive filter that estimates the speed of motion and adjusts the weight W accordingly. Module C5c190 produces motion estimation signals. In many implementations, these signals may already be available as a result of the video coding process. The resulting motion vector MV is output on bus C5c210 and fed to a lookup table C5c200, which produces the weighting value W according to the amount of local motion. Weighting value W is output on line C5c180 and fed to the weighted averager C5c130, where it is used as described above for the apparatus of FIG. 5.

Figure 7:
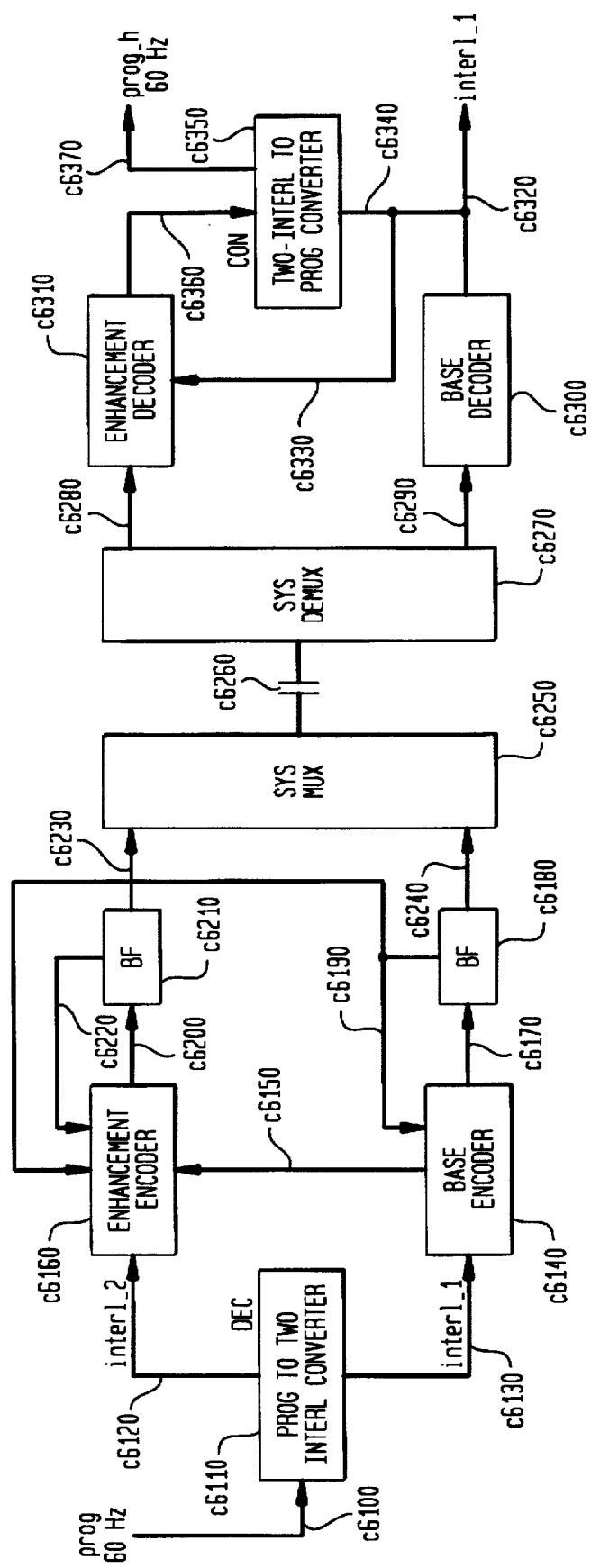
FIG. 7 is a block diagram of a two layer video codec with base layer interlaced, enhancement layer interlaced, and adaptive channel sharing, arranged in accordance with the principles of this invention.

FIG. 7 shows another example of the invention where the base layer consists of an interlaced signal at full resolution, but half the frame rate of the original. Here, a progressive-to-two-interlace-converter c6110 converts each pair of progressive frames on bus c6100 into two interlaced frames and outputs the results on buses c6120 and c6130.

Figure 8:
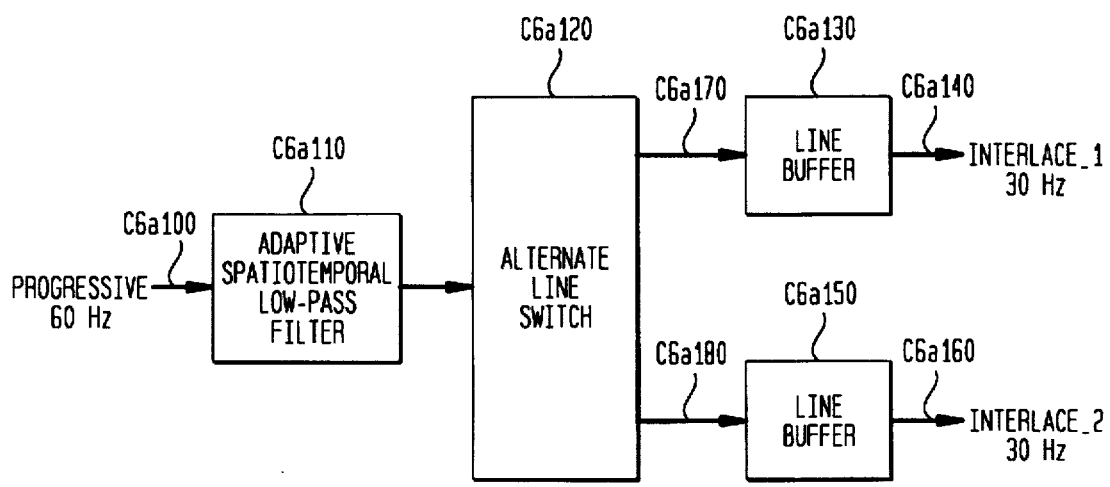
FIG. 8 is a block diagram of a progressive to two-interlaced converter.
Figure 38:
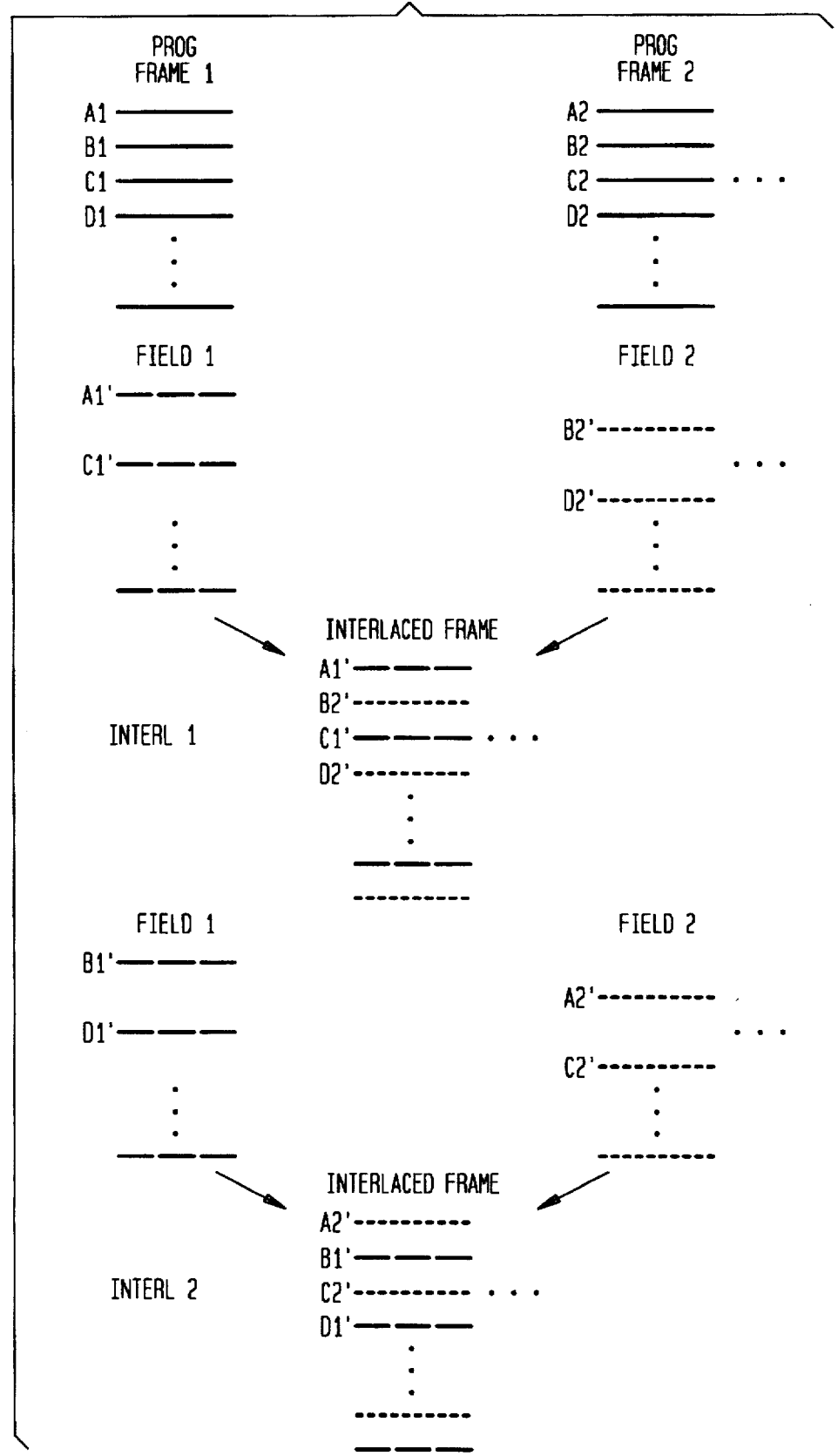
FIG. 38 shows the operation of progressive to two-interlace conversion, arranged in accordance with this invention.

FIG. 8 shows an example of a progressive to two interlace converter. The operation is exactly the same as in FIG. 4 except that instead of discarding every other TV line, the alternate line switch C6a120 feeds each TV line to alternate outputs. Thus, for the first frame of a progressive frame pair, the odd numbered TV lines are fed to output bus C6a170 (interl_1), and the even numbered TV lines are fed to C6a180 (interl_2). For the second frame of a progressive frame pair, the even numbered TV lines are fed to output bus C6a170 (interl_1), and the odd numbered TV lines to bus C6a180 (interl_2). The operation of the progressive to two interlace converter is shown graphically in FIG. 38.

Base encoder c6110 operates in exactly the same way as the base encoder C3140 in FIG. 1, except that it codes full resolution, interlaced video at half the frame rate. A replica decoded base layer video is output on bus c6150 and passed to enhancement encoder c6160 for use in coding the interlaced video input on bus c6120.

Enhancement encoder c4160 operates in exactly the same way as the enhancement encoder C3180 in FIG. 1. However, in this case the prediction interlaced picture on bus c6150 is temporally shifted from the video on bus c4120 that is to be encoded. For this reason a simple coding of the difference is not the most efficient method. An example of encoding is described below.

The remaining operations of encoding, multiplexing, demultiplexing and base decoding are identical to those operations in FIG. 1. In the absence of transmission errors the decoded base layer video on buses c6320, c6330 and c6340 is identical to the replica decoded video on bus c6150.

Enhancement decoder c6310 produces a full resolution, interlaced, half frame-rate video on bus c6360. The fields of this interlaced video are temporally displaced from the field times of the base layer interlaced video on bus c6320. An example of such decoding is described below.

Thus, the decoding process produces an interlaced 30 Hz TV signal on each of the outputs C6340 and C6360. The two interlaced signals are then combined to produce a progressive 60 Hz TV signal by two interlace to progressive Converter c6360 in FIG. 7.

Figure 9:
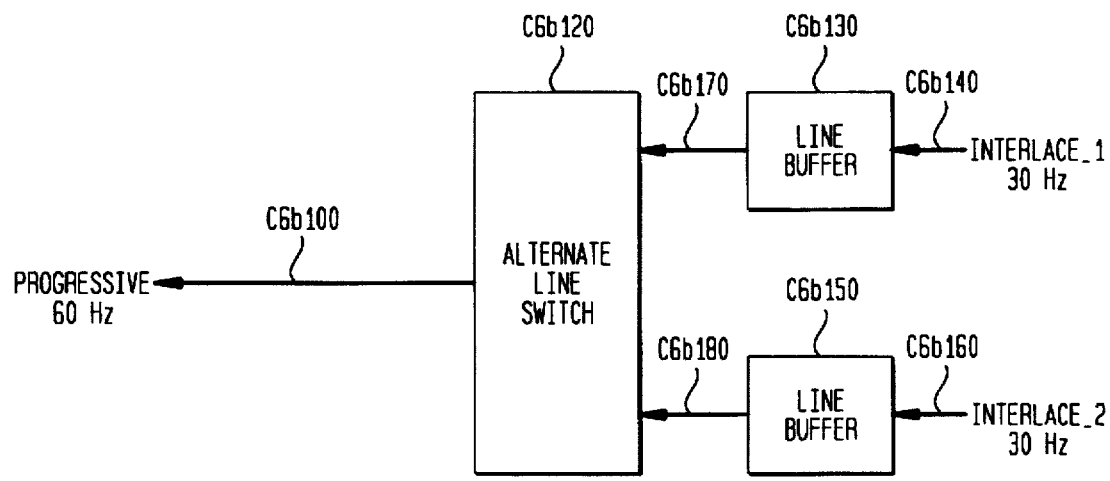
FIG. 9 is a block diagram of a two-interlaced to progressive converter.
Figure 39:
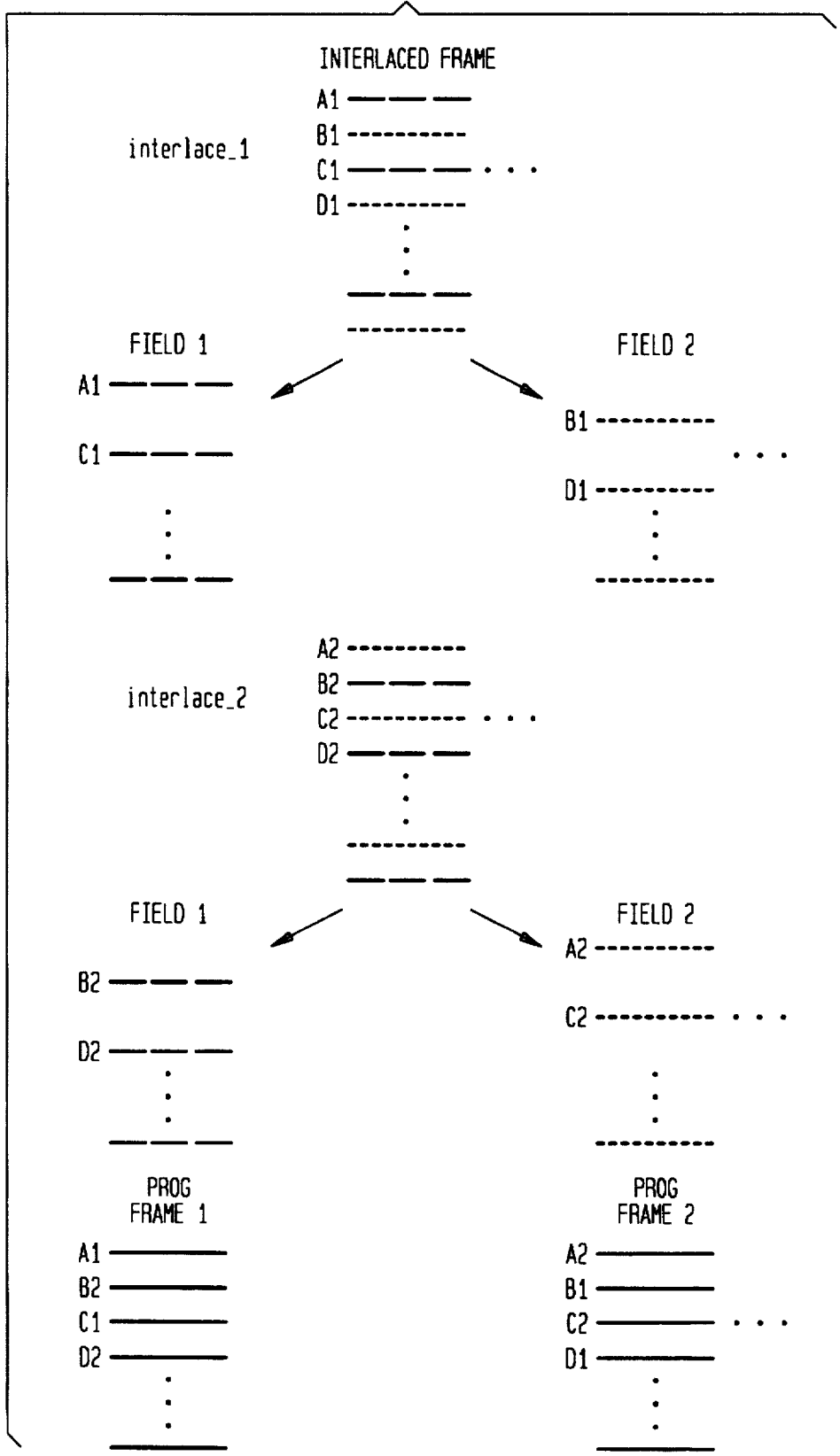
FIG. 39 shows the operation of two-interlace to progressive conversion, arranged in accordance with this invention.

Two-interlace to progressive Converter c6350 basically combines one field on bus c6360 with the temporally corresponding field on bus c6340 to form a progressive frame that is output on bus c6370. Its detailed operation is shown in FIG. 9, which is basically the reverse of the operation of the apparatus of FIG. 8. However, here there is no need for a filter. The processing is also shown graphically in FIG. 39.

The system of FIG. 9 produces a low-pass filtered progressive output. If only a fixed spatial low-pass filter were used, the quality of the progressive output might not be acceptable due to the overall blurriness. The quality may be markedly improved by using the aforementioned motion adaptive filters in module c6a110.

Figure 18:
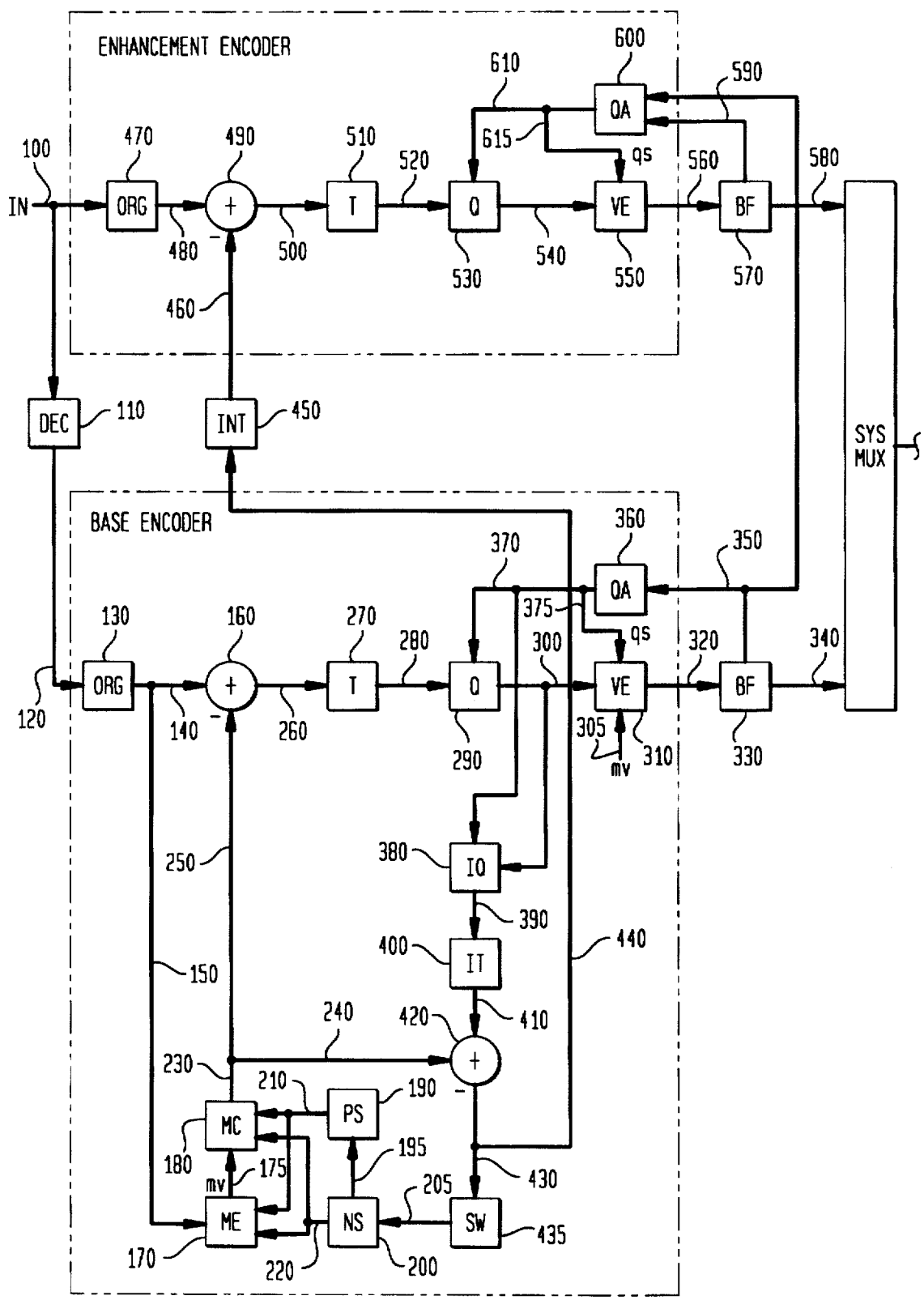
FIG. 18 is a the block diagram of a two layer encoder for a base layer with M=3, and an enhancement layer with I-pictures spatial prediction, arranged in accordance with the principles of this invention.

FIG. 18 shows an example of a base encoder and an enhancement encoder corresponding to the ones shown in of FIG. 1. High resolution video enters on bus e12a100. Spatial decimator e12a110 reduces the number of pels per frame, as described above, and outputs the base layer video on bus e12a120 to a base encoder.

Figure 10:
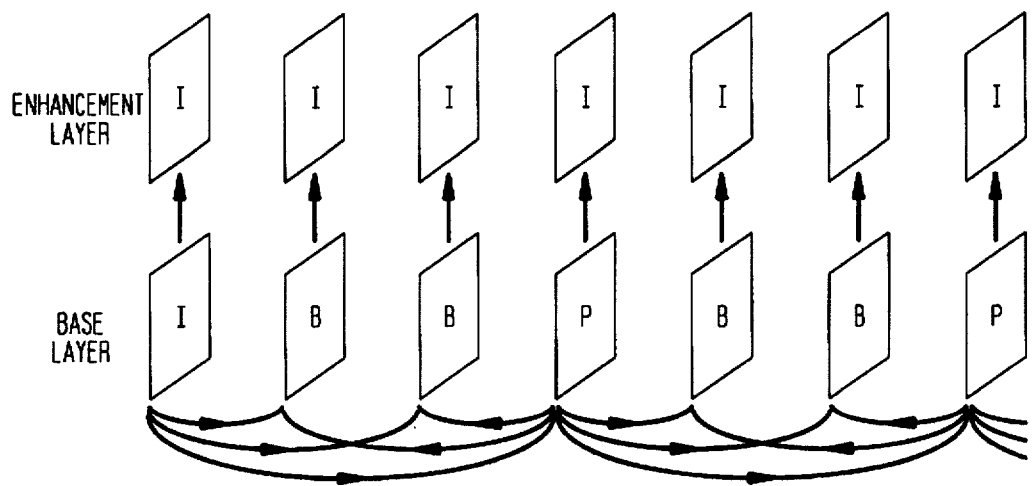
FIG. 10 is picture structure for a base layer with M=3 and an enhancement layer with I-pictures spatial prediction, arranged in accordance with the principles of this invention.
Figure 34:
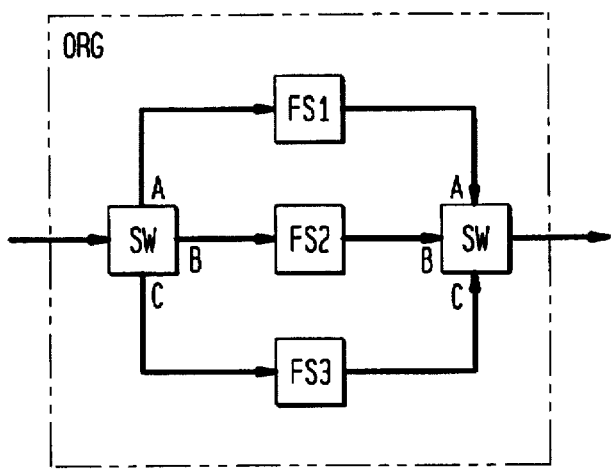
FIG. 34 shows an example of the frame reorganizer block "ORG" of the encoder and decoder block diagrams mentioned above.

The base encoder may be a motion picture experts group (MPEG) arrangement, which for generality is shown as coding MPEG I, B and P pictures according to the structure graphically shown in FIG. 10. A frame reorganizer block ORG e12a130 reorders the input frames in preparation for coding and outputs the result on buses e12a140 and e12a150. An example of a frame reorganizer block is shown in FIG. 34.

A motion estimator e12a170 examines the input frame on bus e12a150 and compares it with one or two previously coded frames. if the input frame is type I or P then one previous frame is used. If it is type B then two previously coded frames are used.

Motion estimator e12a170 outputs motion vectors on bus e12a175 for use by motion compensator e12a180 and on bus e12a305 for use by a variable encoder e12a310. Motion compensator e12a180 utilizes the motion vectors and pels from previously coded frames to compute (for P and B type frames) a motion compensated prediction that is output on bus e12a230 which is passed to busses e12a240 and e12a250. For I type frames, the motion compensator e12a180 outputs zero pel values.

Subtractor e12a160 computes the difference between the input frame on bus e12a140 and (for P and B types) the prediction frame on bus e12a250. The result appears on bus e12a260, is transformed by transformer e12a270 and quantized by quantizer e12a290 into typically integer values. Quantized transform coefficients pass on bus e12a300 to variable encoder e12a310 and inverse quantizer e12a380.

Inverse quantizer e12a380 converts the quantized transform coefficients back to full range and passes the result via bus e12a390 to inverse transform e12a400, which outputs pel prediction error values on bus e12a410. Adder e12a420 adds the prediction error values on bus e12a410 to the prediction values on bus e12a240 to form the coded base layer pels on buses e12a430 and e12a440.

For I and P type frames, switch e12a435 passes the coded pels input on bus e12a430 to a nextpicture store e12ae12a200via a bus e12a205. Simultaneously, the frame that was in nextpicture store e12a20 passes via bus e12a195 to previouspicture store e12a190. For B type frames, switch e12a435 takes no action, and the contents of picture stores e12a190 and e12a200 remain unchanged.

The contents of picture stores e12a190 and e12a200 pass to motion estimator e12a170 and motion compensator e12a180 via buses e12a210 and e12a220 for use as needed.

The quantizer step size qs that is used by quantizer e12a290 and inverse quantizer e12a380 is computed adaptively by quantization adapter e12a360 depending on the aforementioned buffer fullness indication on bus e12a350. The step size passes via bus e12a370 to quantizer e12a290 and inverse quantizer e12a380. The qs variable also passes to variable encoder e12a310 via bus e12a375.

Variable encoder e12a310 encodes quantized transform coefficients input on bus e12a300, motion vectors input on bus e12a305 and quantizer step sizes qs input on bus e12a375 into a typically variable bit-rate bit-stream that is output on bus e12a320.

This bit-stream on bus e12a320 then passes to a buffer e12a330 for temporary storage until it passes via bus e12a540 to the Systems Multiplexer. Also as described above, the fullness of buffer e12a330 is directed to the base encoder and the enhancement encoder of FIG. 18 via bus e12a350.

The coded base layer frames pass via bus e12a440 to interpolator e12a450, as described above, where they are upsampled and passed to the enhancement encoder via bus e12a460.

ORG e12a470 reorders the high resolution video frames to match the order of the base layer and outputs the result on bus e12a480. Subtractor e12a490 computes the difference between the input picture on bus e12a480 that is to be coded and a spatial prediction picture on bus e12a460. The prediction error is output on bus e12a500, transformed by transformer e12a510, quantized by quantizer e12a530 and passed via bus e12a540 to variable encoder e12a550. The quantizer step size used by the enhancement encoder is computed by quantization adapter e12a600 depending on the aforementioned two buffer fullnesses received on buses e12a350 and e12a590. The step size passes via bus e12a610 to quantizer e12a600 and to variable encoder e12a550 via bus e12a615.

Variable encoder e12a550 encodes quantized transform coefficients input on bus e12a540 and quantizer step sizes qs input on bus e12a615 into a typically variable bit-rate bit-stream that is output on bus e12a560.

This bit-stream on bus e12a560 then passes to buffer e12a570 for temporary storage until it passes via bus e12a580 to the Systems Multiplexer. As described above, the fullness of buffer e12a570 passes to the enhancement encoder via bus e12a590.

Figure 11:
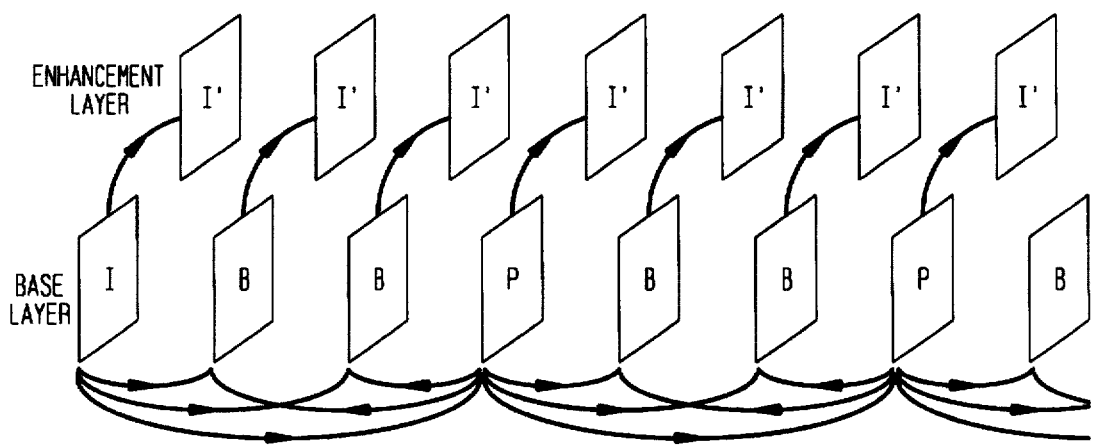
FIG. 11 is a picture structure for a base layer with M=3, and an enhancement layer with I-pictures and unidirectional prediction from the base layer, arranged in accordance with the principles of this invention.
Figure 19:
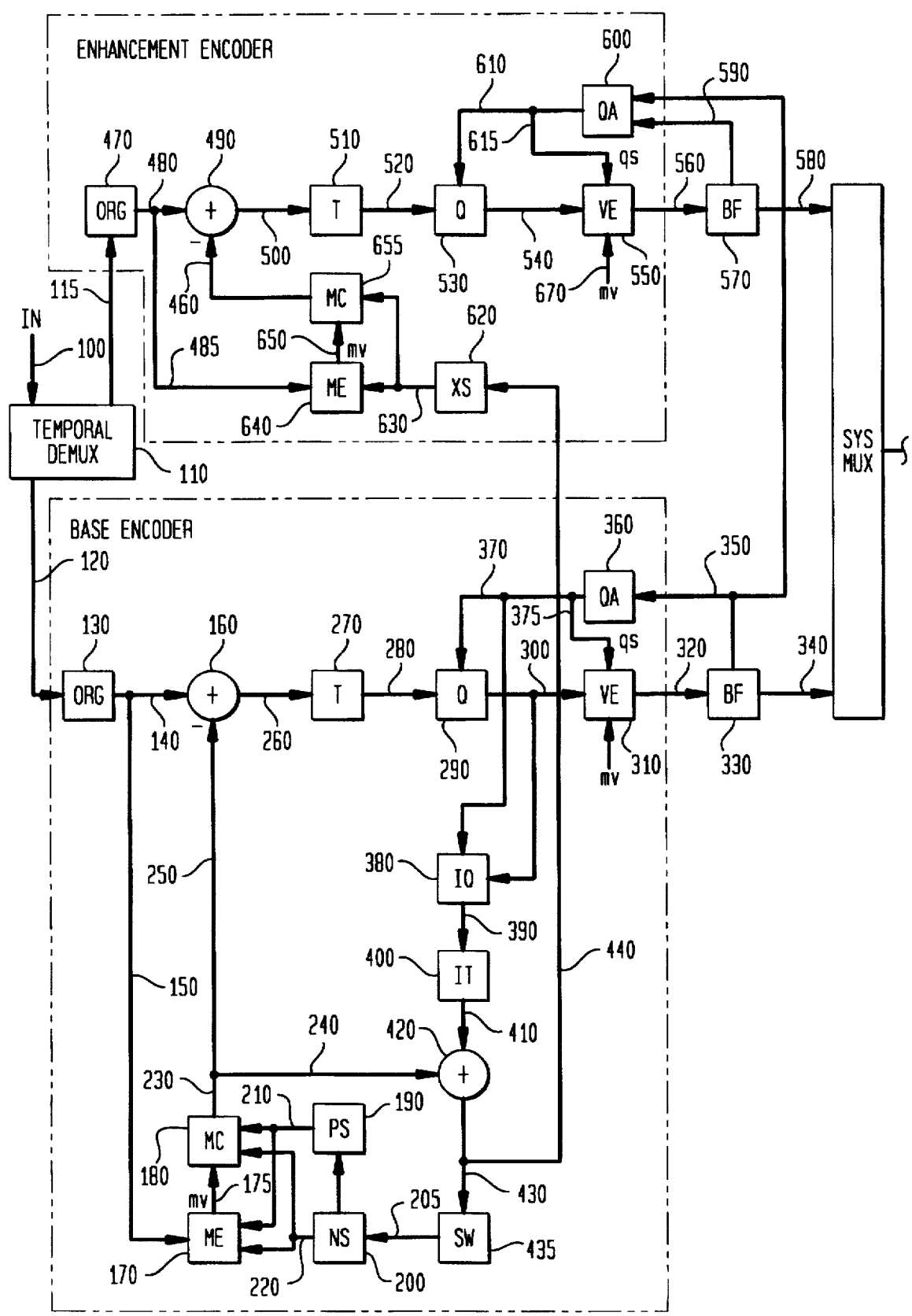
FIG. 19 is a block diagram of a two layer encoder for a base layer with M=3, and an enhancement layer with I-pictures and unidirectional prediction from the base layer, arranged in accordance with the principles of this invention.

FIG. 19 shows an example of a base encoder and an enhancement encoder corresponding to those items shown generally in FIG. 2. Both the base and enhancement layers employ progressive signal at full resolution, but half the frame rate of the original. Alternately, coding can also be performed according to FIG. 7. The picture structure for this encoder is shown in FIG. 11. For the purpose of explanation of encoding operations, assume coding according to FIG. 2.

High resolution video enters on bus e12b100. A temporal demultiplexer e12b110 may be a simple switching mechanism which routes alternate frames of progressive input to output buses e12b115 and e12b120, respectively.

The base encoder in FIG. 19 operates in exactly the same way as the base encoder in FIG. 18, except that it codes full resolution video at half the frame rate. A replica decoded base layer video is output on bus e12b440 that is full resolution. Thus, there is no need for upsampling prior to delivery to the enhancement encoder.

The enhancement encoder in FIG. 19 is similar to that of FIG. 18. However, in this case, the prediction picture on bus e12b440 is temporally shifted from the video frames on bus e12b115 that are to be encoded. For this reason, a simple coding of the difference may not be the most efficient method.

ORG e12b470 reorders the high resolution video frames to match the order of the base layer and outputs the result on buses e12b480 and e12b485.

The base layer prediction picture on bus e12b440 first enters a transition store e12b620 whose contents are made available on bus e12b630 to motion estimator e12b640 and motion compensator e12b655.

Motion estimator e12b640 examines the input frame on bus e12b485 and compares it with the base layer prediction frame on bus e12b630. Motion estimator e12b640 outputs motion vectors on bus e12b650 for use by motion compensator e12b655 and on bus e12b670 for use by variable encoder e12b550. Motion compensator e12b655 utilizes the motion vectors and pels from the base layer prediction frame to compute a motion compensated prediction that is output on bus e12b460 and passes to Subtractor e12b490.

The remaining operations of the Encoding operation of FIG. 19 are identical to those of FIG. 18, except that variable encoder e12b550 inserts the motion vectors on bus e12b670 into the output bit-stream.

Figure 12:
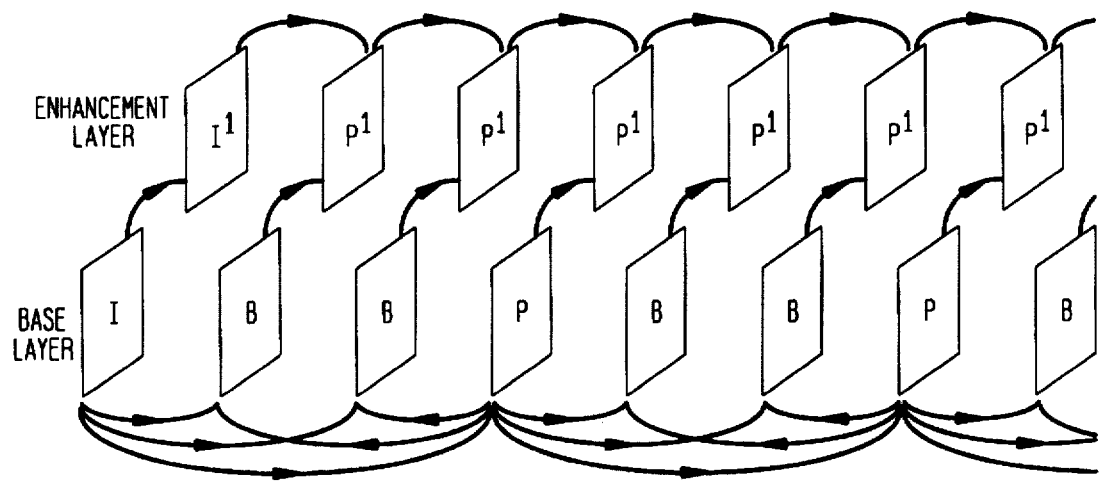
FIG. 12 is a picture structure for a base layer with M=3, and an enhancement layer with M=1 and unidirectional prediction from the base layer, arranged in accordance with the principles of this invention.
Figure 20:
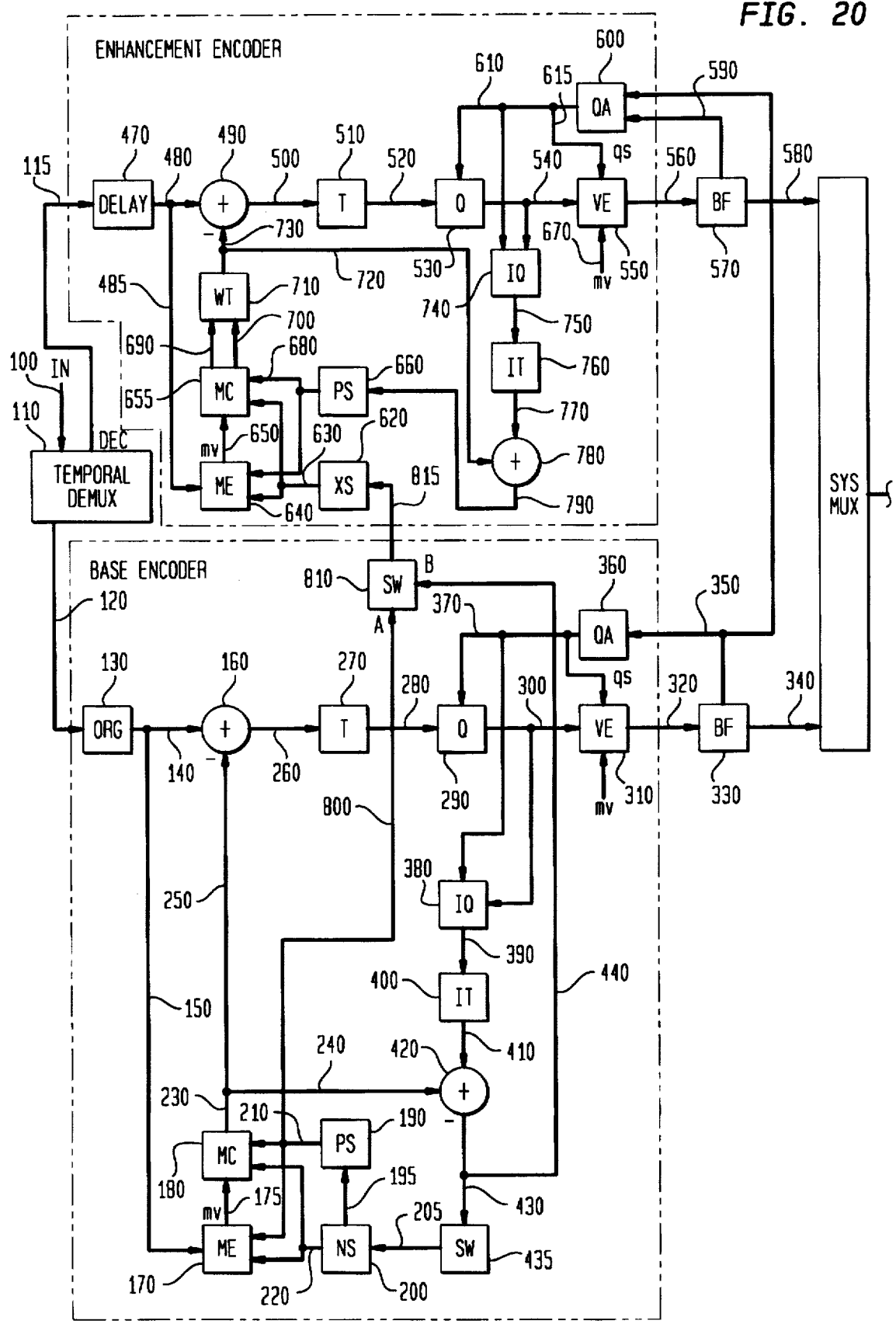
FIG. 20 is a block diagram of a two layer encoder for a base layer with M=3, and an enhancement layer with M=1 and unidirectional prediction from the base layer, arranged in accordance with the principles of this invention.

FIG. 20 shows an example of a base encoder and enhancement encoder corresponding to those items in the system of FIG. 2. Both the base and enhancement layers employ progressive signal at full resolution, but half the frame rate of the original. Alternately, coding can also be performed according to FIG. 7. The picture structure for this encoder is shown in FIG. 12. For the purpose of explanation of encoding operations, assume coding according to FIG. 2.

High resolution video enters on bus e12d100. Temporal demultiplexer e12d110 may be a simple switching mechanism that routes alternate frames of progressive input to output buses e12d115 and e12d120, respectively.

The base encoder in FIG. 20 operates in the same way as the base encoder in FIG. 19, except for the replica base layer video, which is described below.

The enhancement encoder of FIG. 20 has several differences compared with that of FIG. 19. First, the enhancement layer video frames are not reordered prior to encoding. This means that the decoded base layer frames that are to be used as predictions are not in the correct order and must be reordered back to the original camera order. Second, the prediction is computed as a weighted average of two predictions, as described below.

An ORG module, as shown in FIG. 34, could be used to reorder the replica decoded base layer video to match that of the enhancement layer. However, a much simpler solution is provided by switch e12d810. After the encoding of a B type frame in the base layer, switch e12d810 is in the "B" position which routes the B frame from the output of adder e12d420 via bus e12d440 to its output on bus e12d815. During the encoding of I and P type frames, switch e12d810 is in the "A" position and routes previously coded frames from bus e12d210 via bus e12d800 so that they match temporally with the frames being encoded in the enhancement layer.

As mentioned above, the enhancement layer video on bus e12d115 is not reordered prior to encoding. Thus, delay e12d470 delays the enhancement layer video on bus e12d115 in order to temporally match the replica decoded base layer video on bus e12d815. The delayed enhancement layer video passes to a subtractor e12d490 and a motion estimator e12d640 via buses e12d480 and e12d485, respectively.

The base layer prediction picture on bus e12d815 enters a transition store e12d620 whose contents are made available on bus e12d630 to the motion estimator e12d640 and a motion compensator e12d655.

Motion estimator e12d640 examines the enhancement layer input frame on bus e12d485 and compares it with the base layer prediction frame on bus e12d630. Motion estimator e12d640 outputs motion vectors on bus e12d650 for use by the motion compensator e12d655 and on bus e12d670 for use by a variable encoder e12d550. Motion compensator e12d655 utilizes the motion vectors and pels from the base layer prediction frame to compute a motion compensated prediction that is output on bus e12d690 and passes to weighter e12d710 on bus e12d690.

Motion estimator e12d640 also examines the enhancement layer input frame on bus e12d485 and compares it with the previously coded enhancement layer frame on bus e12d680 to compute additional motion vectors. Motion estimator e12d640 outputs these additional motion vectors also on bus e12d650 for use by motion compensator e12d655 and on bus e12d670 for use by variable encoder e12d550. Motion compensator e12d655 utilizes these motion vectors and pels from the enhancement layer prediction frame on bus e12d680 to compute another motion compensated prediction that passes to the weighter e12d710 on bus e12d700.

Weighter e12d710 computes a weighted average of the two predictions input on buses e12d690 and e12d700 and outputs the result on buses e12d720 and e12d730 to subtractor e12d490 and adder e12d780, respectively. The weighting may be fixed, or it may adapt to such factors as the amount on motion in the scene, scene changes, etc. The weights could be limited to a finite set to minimize transmission overhead. Or the weights could be limited to 0 and 1, in which case the Weighter becomes a simple switch that passes either the input from bus e12d690 or the input from bus e12d700.

The remaining operations of the Enhancement Encoding are identical to those of the Base Layer, except for the Quantization Adaptation e12d600 which operates in exactly the same way as in FIGS. 18 and 19.

Specifically, the prediction error is calculated by subtractor e12d490, transformed by transformer e12d510, quantized by quantizer e12d530, encoded along with the quantizer step size qs and motion vector mv by variable encoder e12d550, sent to buffer e12d570, and then sent to the systems multiplexer.

The decoded enhancement layer video, which is needed for motion compensation of the next enhancement layer frame, is calculated in the same way as in the base layer, except that there are no B-type frames. Specifically, the quantized transform coefficients are converted to full range by inverse quantizer e12d740, converted to prediction error pel values by inverse transform e12d760, added to the motion compensated prediction by adder e12d780, and passed to the previous frame store e12d660 for use in motion estimation of the next frame.

Figure 21:
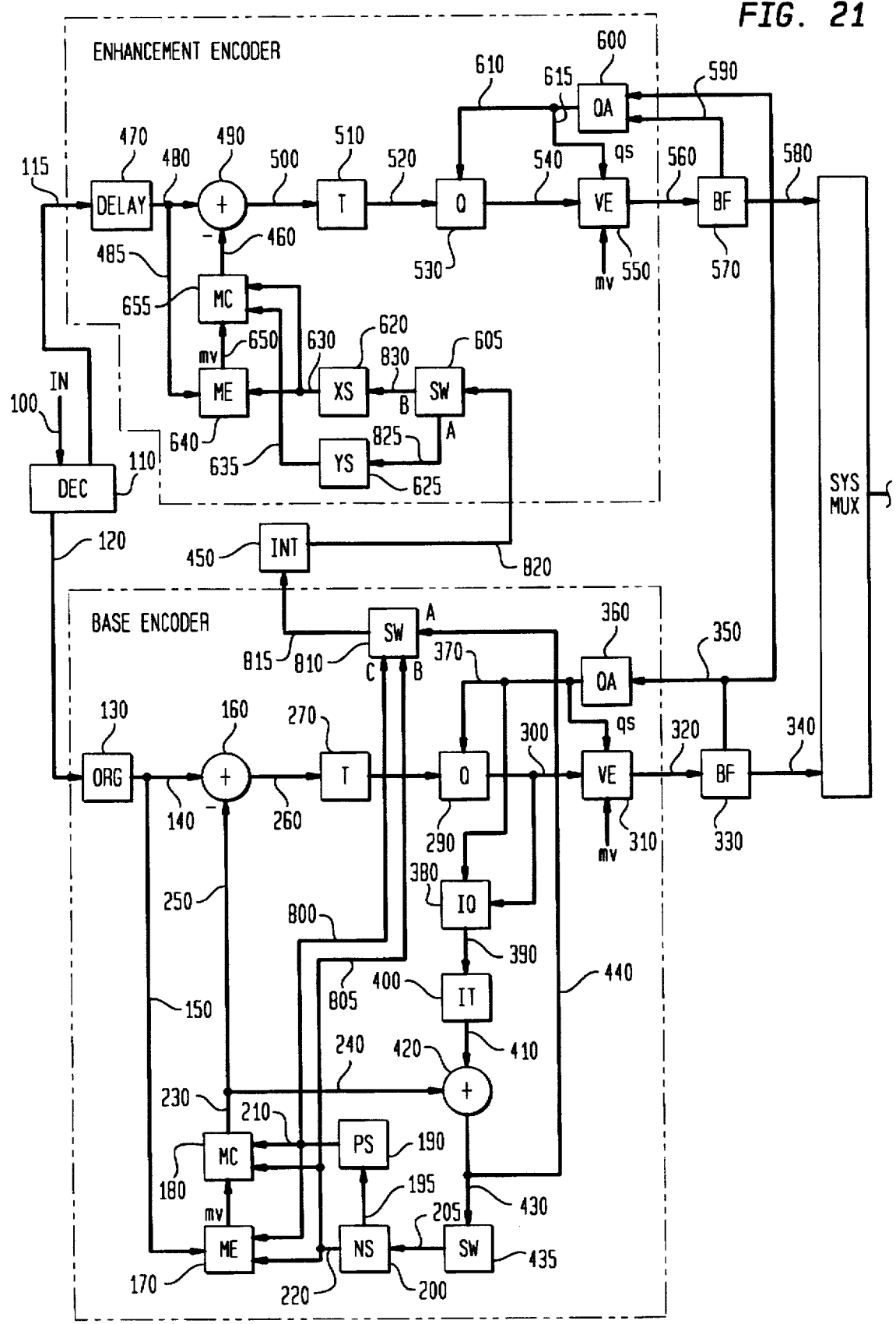
FIG. 21 is a block diagram of a two layer encoder for a base layer with M=3, and an enhancement layer with I-pictures and unidirectional prediction from the base layer, arranged in accordance with the principles of this invention.

FIG. 21 shows an example of a base encoder and an enhancement encoder corresponding to those in FIG. 2. Both the base and enhancement layers employ progressive signal at full resolution, but at half the frame rate of the original. Alternately, coding can also be performed according to FIG.

Figure 13:
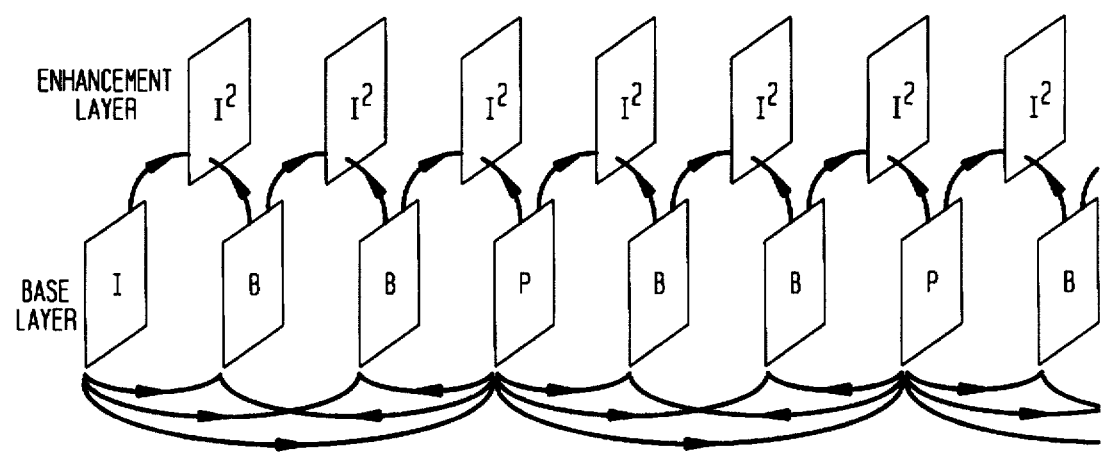
FIG. 13 is a picture structure for a base layer with M=3, and an enhancement layer with I-pictures and unidirectional prediction from the base layer, arranged in accordance with the principles of this invention.

7. The picture structure for this encoder is shown in FIG. 13. For the purpose of illustrative explanation of encoding operations, assume coding according to FIG. 2.

High resolution and frame rate video enters on bus e12e100. In this example, the decimator e12e110 is temporal demultiplexer, a simple switching mechanism that routes alternate frames of progressive input video to output buses e12e115 and e12e120, respectively. The interpolator e12e450 is a 1:1 upsampler (alternately, there is no need for upsampling in some examples).

The Base Encoder operates in exactly the same way as in FIG. 19. A replica decoded base layer video is output on bus e12e440 that is full resolution. The Enhancement Encoder is similar to that of FIG. 19, it, however, uses bidirectional prediction from base layer.

Delay e12e470 delays the high resolution video frames of the enhancement layer.

The base layer prediction picture on bus e12e440, as well as contents of picture stores e12e210 and e12e220 on respective buses e12e800 and e12e805, are available at switch e12e810. Depending on the picture being coded in the enhancement encoder, specific two out of three available base layer prediction frames at the input of switch e12e810 are necessary in the enhancement layer and pass via a 1:1 interpolator e12e450 to switch e12e605 and enter transition stores e12e620 and e12e625 both of whose contents are made available on bus e12e630 and bus e12e635 to motion estimator e12e640 and motion compensator e12e655.

To be more clear, we refer to the pair of B frames between every pair of reference frames in the base layer of FIG. 13 as B1 and B2 frames, and frames of enhancement layer as the first $I^2$ frame, the second $I^2$ frame, the third $I^2$ frame and so on. During the encoding of I and P type frames of the base layer, switch e12e810 is in the "C" position and routes previously coded frames from bus e12e210 via bus e12e800 and through the switch e12e815 to bus e12e820 and further through switch e12e605 which is in "B" position to frame store e12e620. After the encoding of a B1 frame, switch e12e810 is in the "A" position and routes the B1 frame from the output of the adder e12e420 via bus e12e440 to its output on bus e12e815 and through the switch e12e605 which is in "A" position to the frame store e12e625. At this time, encoding of the first $I^2$ frame is accomplished. After the encoding of a B2 frame, switch e12e810 is in the "A" position and routes the B2 frame from the output of adder e12e420 via bus e12e440 to its output on bus e12e815 and through the switch e12e605 which is in "B" position to frame store e12e620. Now the encoding of second $I^2$ frame is accomplished. At this time, to accomplish encoding of the third $I^2$ frame, contents of picture store e12e200 are routed on bus e12e800 and through switch e12e810 which is in "B" position to switch e12e605 which is in "A" position and to frame store e12e625. This process repeats itself for coding of subsequent frames.

Motion estimator e12e640 examines the input frame on bus e12e485 and compares it with the base layer predictions on bus e12e630 and on bus e12e635. Motion estimator e12e640 outputs motion vectors on bus e12e650 for use by motion compensator e12e655. Motion vectors are also made available for use by a variable encoder e12e550. Motion compensator e12e655 utilizes the motion vectors and pels from the two base layer prediction frames to compute a motion compensated prediction that is output on bus e12e460 and passes to subtractor e12e490.

The remaining operations of the encoding in FIG. 21 are identical to those of FIG. 19.

Figure 14:
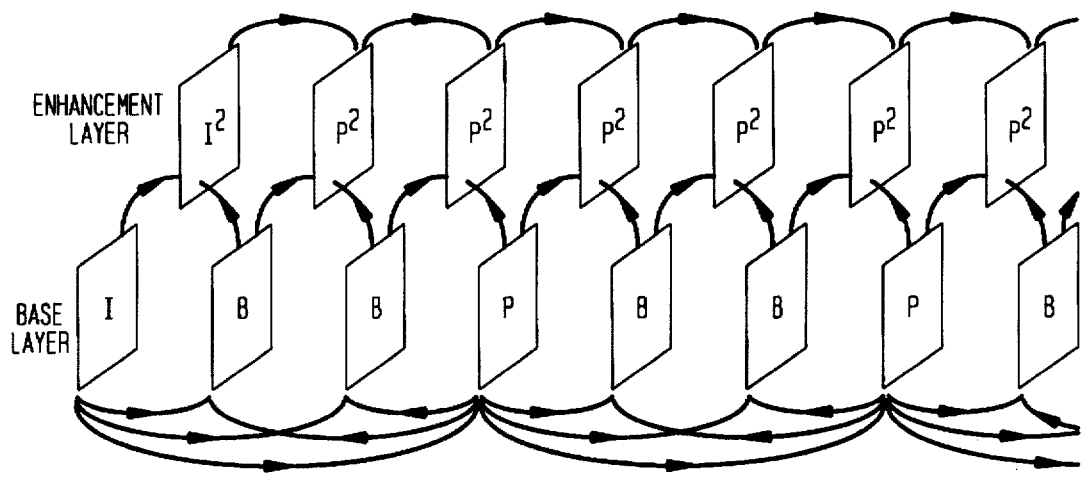
FIG. 14 is a picture structure for a base layer with M=3, and an enhancement layer with M=1 and bi-directional prediction from the base layer, arranged in accordance with the principles of this invention.
Figure 22:
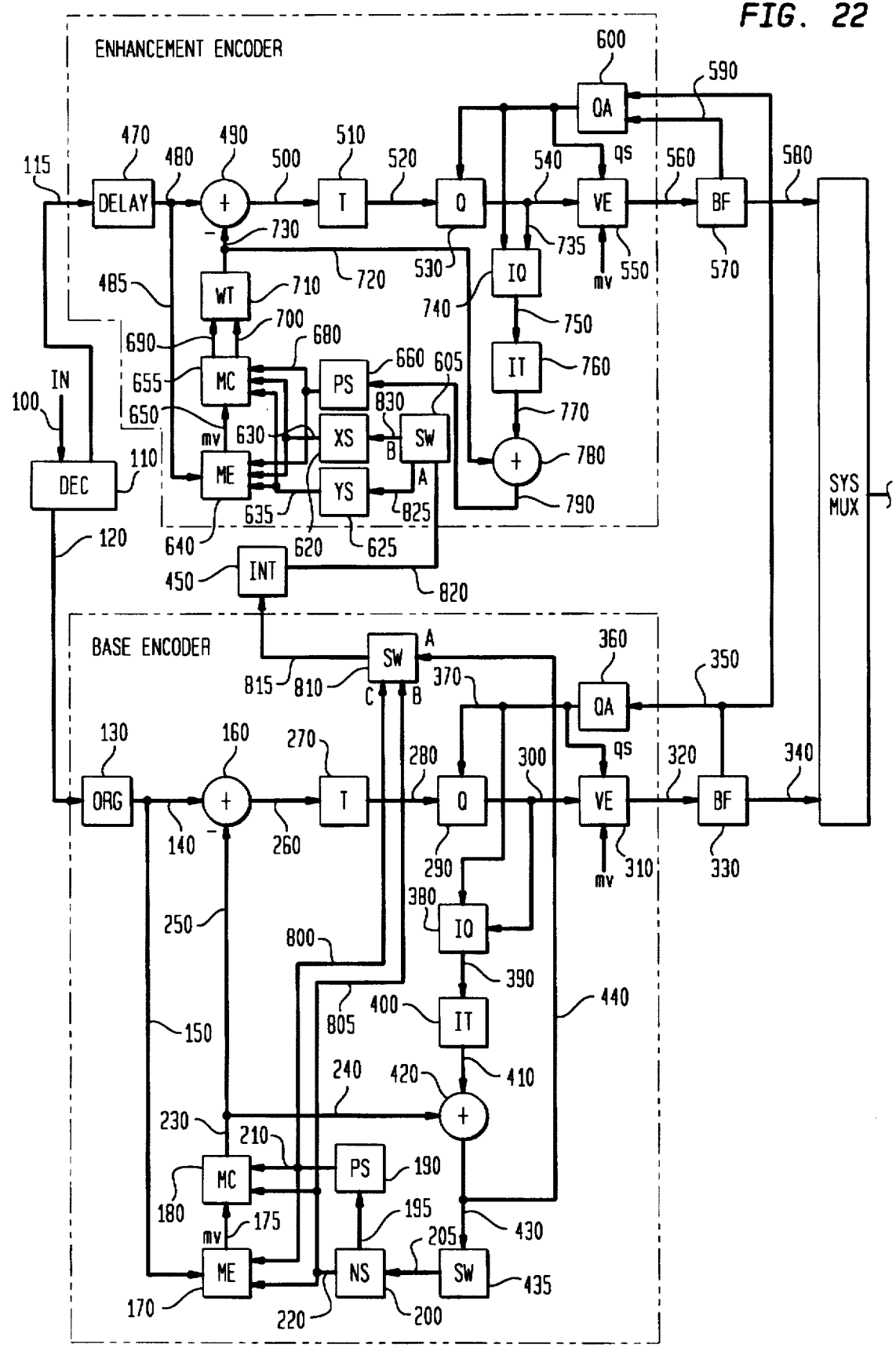
FIG. 22 is a block diagram of a two layer encoder for a base layer with M=3, and an enhancement layer with M=1 and bi-directional prediction from base layer, arranged in accordance with the principles of this invention.

FIG. 22 shows an example of a base encoder and an enhancement encoder corresponding to those in FIG. 2. Both the base and enhancement layers employ progressive signal at full resolution, but at half the frame rate of the original. Alternately, coding can also be performed according to FIG. 7. The picture structure for this encoder is shown in FIG. 14. For the purpose of illustrative explanation of encoding operations, assume coding according to FIG. 2.

High resolution and frame rate video enters on bus e12g100. In this example, the decimator is e12g110 is a temporal demultiplexer, a simple switching mechanism that routes alternate frames of progressive input video to output buses e12g115 and e12g120, respectively. The interpolator, e12g450 is a 1:1 upsampler.

The base encoder in FIG. 22 operates in the same way the base encoder in FIG. 21 operates. The enhancement encoder has a notable difference compared with the enhancement encoder of FIG. 21 since it allows not only base layer frames as predictions but also temporal prediction from the enhancement layer.

The base layer prediction picture on bus e12g440, as well as contents of picture stores e129210 and e12g220 on respective buses e12g800 and e12g805, are available at switch e12g810. Depending on the picture being coded in the enhancement encoder, specific two out of three available base layer prediction frames at the input of switch e12g810 are necessary in the enhancement layer and pass via a 1:1 interpolator e12g450 to switch e12g605 and enter transition stores e12g620 and e12g625 both of whose contents are made available on bus e12g630 and bus e12g635 to motion estimator e12g640 and motion compensator e12g655.

In a manner similar to FIG. 21, we refer to the pair of B frames between every pair of reference frames in the base layer of FIG. 14 as B1 and B2 frames, and frames of the enhancement layer as the first $I^2$ frame, the first $P^2$ frame, the second $P^2$ frame, and so on. During the encoding of I and P type frames of the base layer, switch e12g810 is in the "C" position and routes previously coded frames from bus e12g210 via bus e12g800 and through the switch e12g815 to bus e12g820 and further through switch e12g605, which is in "B", position to frame store e12g620. After the encoding of a B1 frame, switch e12g810 is in the "A" position and routes the B1 frame from the output of adder e12g420 via bus e12g440 to its output on bus e12g815 and through the switch e12g605 which is in the "A" position to frame store e12g625. At this time, encoding of the first $I^2$ frame is accomplished, coded frame appears via bus e12g790 and is stored in frame store e12g660 to be used for prediction of the first $P^2$ frame. After the encoding of a B2 frame, switch e12g810 is in the "A" position and routes the B2 frame from the output of adder e12e420 via bus e12g440 to its output on bus e12g815 and through the switch e12g605, which is in "B" position, to frame store e12g620. Now the encoding of first $P^2$ frame is accomplished, the coded frame appears via bus e12g790 and is stored in frame store e12g660 to be used for prediction of the second $P^2$ frame. At this time, to accomplish encoding of the second $P^2$ frame, the contents of picture store e12g200 are routed on bus e12g800 and through switch e12g810 which is in the "B" position to switch e12g605, which is in the "A" position, and to frame store e12g625. The coded frame appears via bus e12g790 and is stored in frame store e12g660 to be used for prediction the next $P^2$ frame. This process repeats itself for coding of subsequent frames.

Motion estimator e12g640 examines the enhancement layer input frame on bus e12g485 and compares it with the base layer prediction frames on bus e12g630 and bus e12g635. Motion estimator e12g640 outputs motion vectors on bus e12g650 for use by motion compensator e12g655 and by variable encoder e12g550. Motion compensator e12g655 utilizes the motion vectors and pels from the base layer prediction frames to compute a motion compensated prediction that is output on bus e12g690 and passes to weighter e12g710 on bus e12g690.

Motion estimator e12g640 also examines the enhancement layer input frame on bus e12g485 and compares it with the previously coded enhancement layer frame on bus e12g680 to compute additional motion vectors. Motion estimator e12g640 outputs these additional motion vectors also on bus e12g650 for use by motion compensator e12g655 and for use by variable encoder e12g550. Motion compensator e12g655 utilizes these motion vectors and pels from the enhancement layer prediction frame on bus e12g680 to compute another motion compensated prediction that passes to weighter e12g710 on bus e12g700.

Weighter e12g710 computes a weighted average of the two predictions input on buses e12g690 and e12g700 and outputs the result on buses e12g720 and e12g730 to subtractor e12g490 and adder e12g780, respectively. The weighting may be fixed, or it may adapt to such factors as the amount on motion in the scene, scene changes, and the like. The weights could be limited to a finite set to minimize transmission overhead. Or the weights could be limited to 0 and 1, in which case the weighter becomes a simple switch that passes either the input from bus e12g690 or the input from bus e12g700.

The remaining operations of enhancement encoding are identical to those of the Base Layer, except for the quantization adaptation e12d600 which operates in exactly the same way as in FIGS. 18 and FIG. 19.

Specifically, the prediction error is calculated by subtractor e12g490, transformed by transformer e12g510, quantized by quantizer e12g530, encoded along with the quantizer step size qs and motion vector mv by variable encoder e12g550, sent to buffer e12g570 and thence to the systems multiplexer.

The decoded enhancement layer video, which is needed for motion compensation of the next enhancement layer frame, is calculated in the same way as in the base layer, except that there are no B-type frames. Specifically, the quantized transform coefficients are converted to full range by inverse quantizer e12g740, converted to prediction error pel values by inverse transform e12g760, added to the motion compensated prediction by adder e12g780 and passed to the previous frame store e12g660 for use in motion estimation of the next frame.

Figure 15:
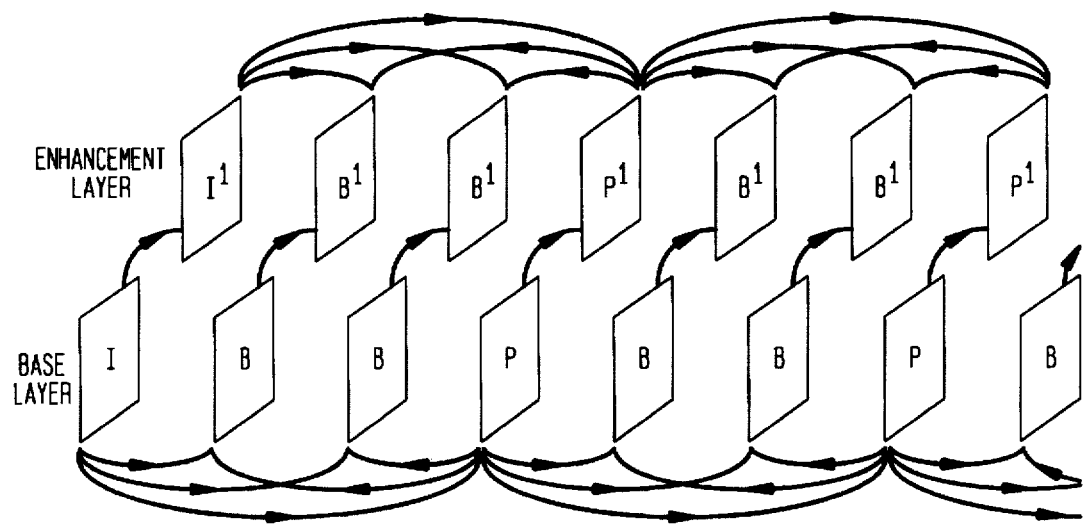
FIG. 15 is a picture structure for a base layer with M=3, and an enhancement layer with M=3 and unidirectional prediction from the base layer, arranged in accordance with the principles of this invention.
Figure 23:
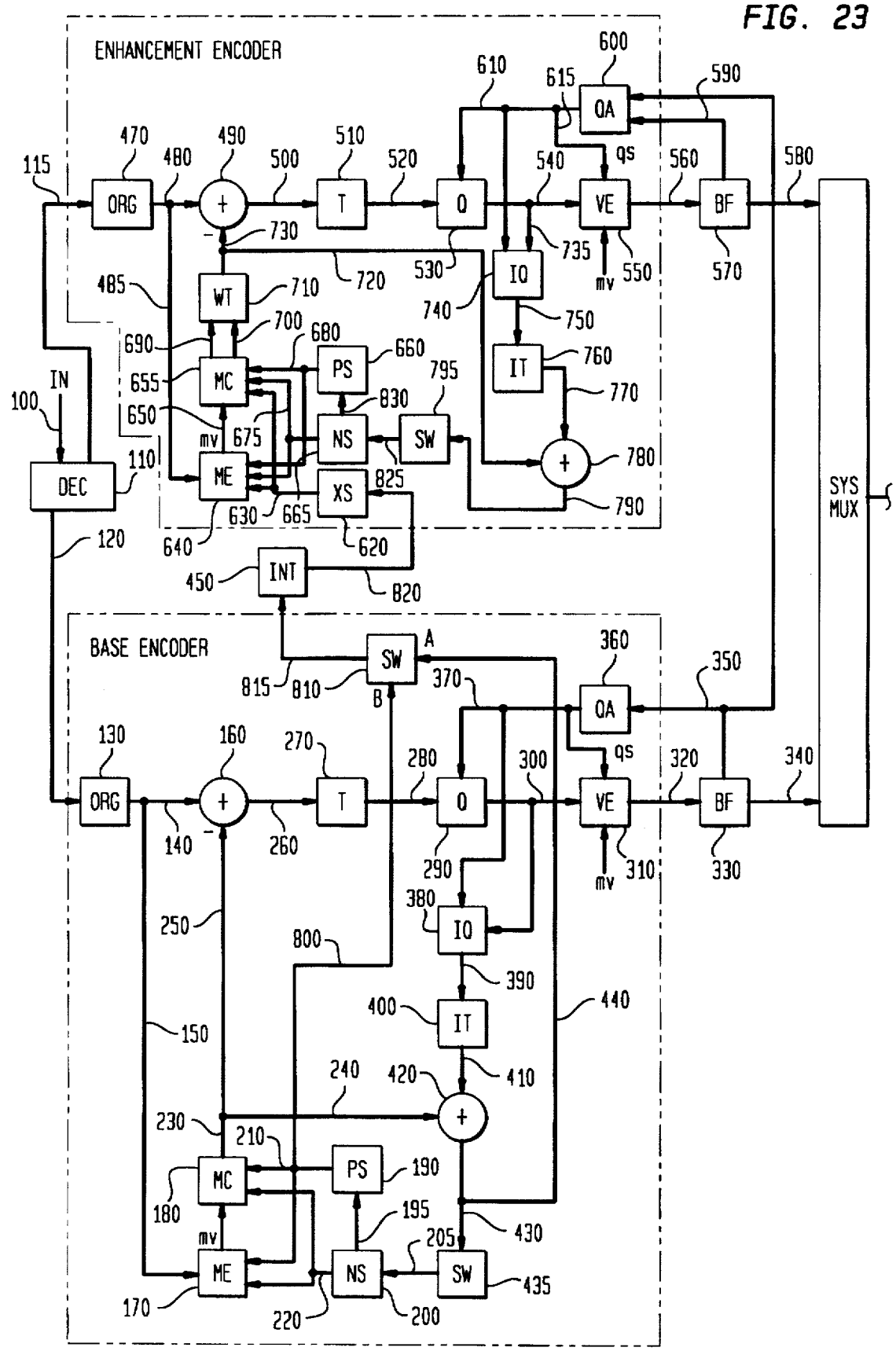
FIG. 23 is a block diagram of a two layer encoder for a base layer with M=3, and an enhancement layer with M=3 and unidirectional prediction from base layer, arranged in accordance with the principles of this invention.

FIG. 23 shows an example of a base encoder and an enhancement encoder corresponding to those of FIG. 2. Both the base and enhancement layers employ a progressive signal at full resolution, but at half the frame rate of the original. Alternately, coding can also be performed according to FIG. 7. The picture structure for this encoder is shown in FIG. 15. For the purpose of illustrative explanation of encoding operations, assume coding according to FIG. 2.

High resolution and high frame rate video enters on bus e12h100. In this example, decimator e12h110 is a temporal demultiplexer, a simple switching mechanism that routes alternate frames of progressive input video to output buses e12h115 and e12h120, respectively. The interpolator e12h450 is a 1:1 upsampler (alternately, there may be no need for upsampling).

The base encoder in FIG. 23 operates in the same way that the base encoder of FIG. 20 operates.

The enhancement encoder has a very similar operation to that of the base encoder, except that it uses a weighted combination of motion compensated prediction from the enhancement layer with motion compensated prediction from the base layer.

ORG e12h470 reorders the high resolution video frames to match the order of the base layer and outputs the result on buses e12h480 and e12h485.

Motion estimator e12h640 examines the enhancement layer input frame on bus e12h485 and compares it with the base layer prediction frame on bus e12h630. Motion estimator e12h640 outputs motion vectors on bus e12h650 for use by motion compensator e12h655 and by variable encoder e12h550. Motion compensator e12h655 utilizes the motion vectors and pels from the base layer prediction frame to compute a motion compensated prediction that is output on bus e12h690 and passes to weighter e12h710 on bus e12h690.

Motion estimator e12h640 also examines the enhancement layer input frame on bus e12h485 and compares it with the previously coded enhancement layer frame on bus e12h680 to compute additional motion vectors. Motion estimator e12h640 outputs these additional motion vectors also on bus e12h650 for use by motion compensator e12h655 and for use by variable encoder e12h550. Motion compensator e12h655 utilizes these motion vectors and pels from the enhancement layer prediction frame on bus e12h680 to compute another motion compensated prediction that passes to weighter e12h710 on bus e12h700.

Weighter e12h710 computes a weighted average of the two predictions input on buses e12h690 and e12h700 and outputs the result on buses e12h720 and e12h730 to subtractor e12h490 and adder e12h780, respectively. The weighting may be fixed, or it may adapt to such factors as the amount on motion in the scene, scene changes, and the like. The weights could be limited to a finite set to minimize transmission overhead. Or the weights could be limited to 0 and 1, in which case the weighter becomes a simple switch that passes either the input from bus e12h690 or the input from bus e12h700.

The remaining operations of the enhancement encoding are identical to those of the base layer, except for the quantization adaptation e12h600 which operates in exactly the same way as it does in FIGS. 18 and FIG. 19.

Specifically, the prediction error is calculated by subtractor e12h490, transformed by transformer e12h510, quantized by quantizer e12h530, encoded along with the quantizer step size qs and motion vector mv by variable encoder e12h550, sent to buffer e12h570 and thence to the systems multiplexer.

The decoded enhancement layer video, which is needed for motion compensation of the next enhancement layer frame according to M=3 structure explained in description of FIG. 15, is calculated in the same way as in the base layer. Specifically, the quantized transform coefficients are converted to full range by inverse quantizer e12h740, converted to prediction error pel values by inverse transform e12h760, added to the motion compensated prediction by adder e12h780 and if it is an I- or P-frame, it is passed to the next frame store e12h665 after shifting the contents of next frame store to previous frame store e12h660, for use in motion estimation of the following frame in coding order according to M=3 structure.

Figure 16:
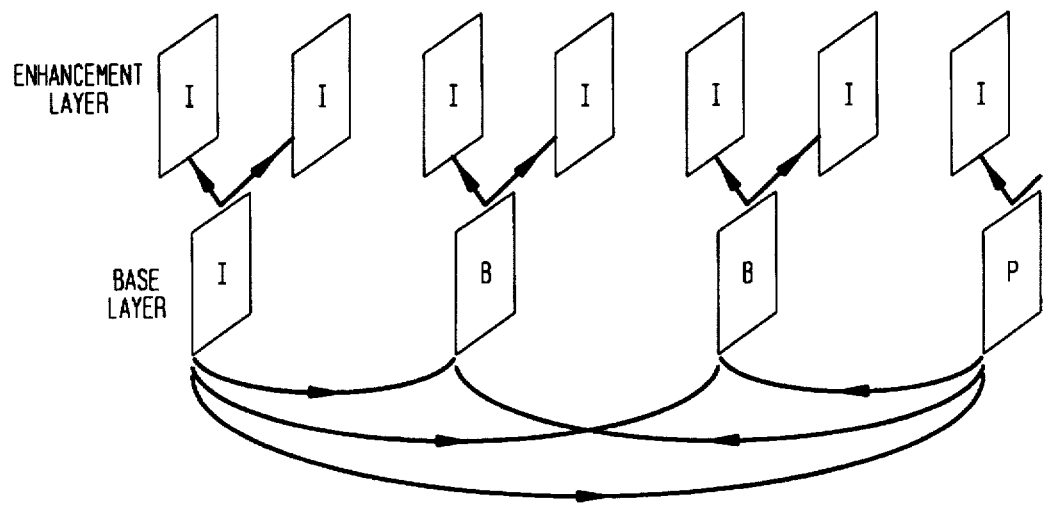
FIG. 16 is a picture structure for a base layer with M=3, and an enhancement layer with I-pictures spatial prediction at twice the picture rate of base layer, arranged in accordance with the principles of this invention.
Figure 24:
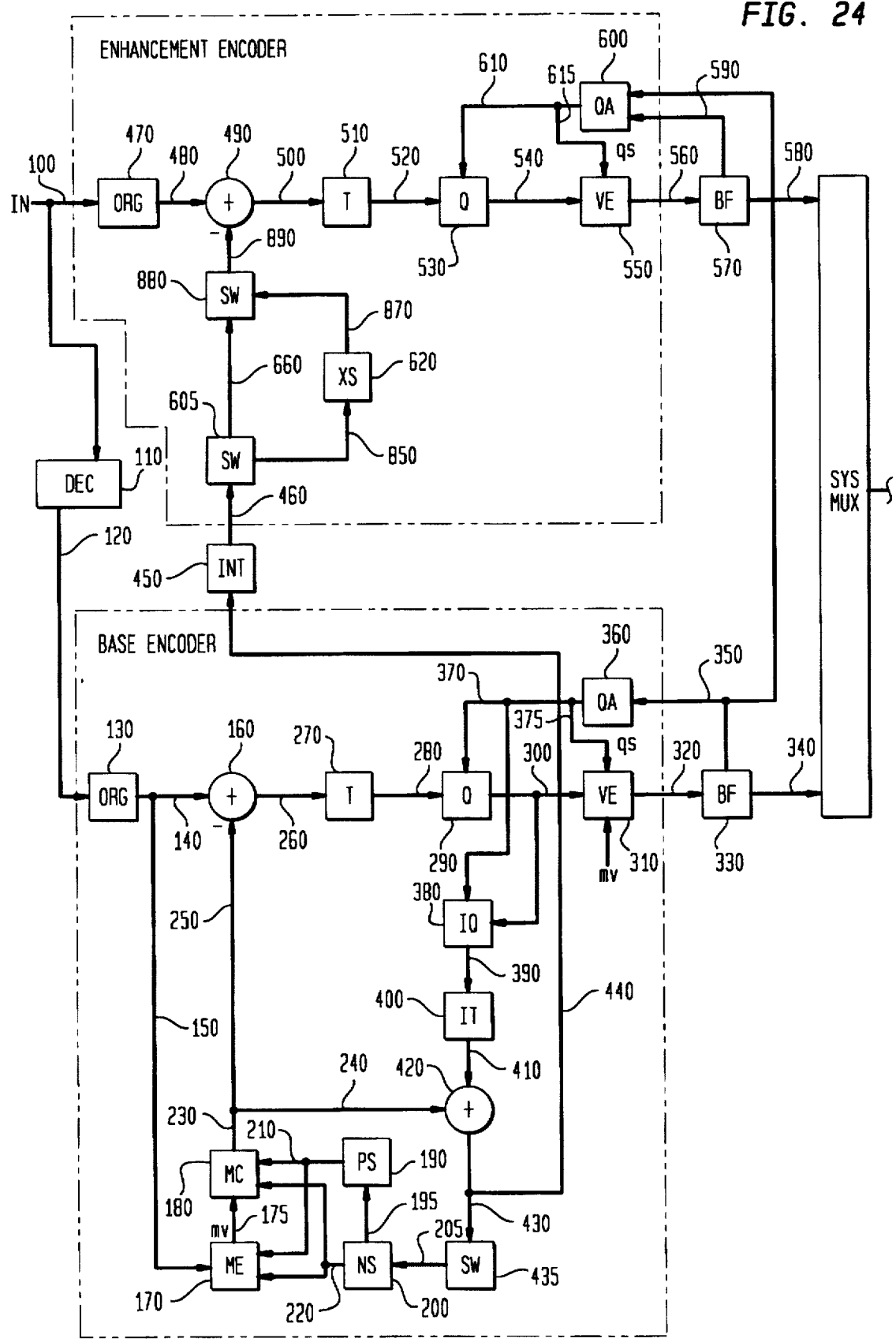
FIG. 24 is a block diagram of a two layer encoder for a base layer with M=3, and an enhancement layer with I-pictures spatial prediction at twice the picture rate of the base layer, arranged in accordance with the principles of this invention.

FIG. 24 shows an example of a base encoder and an enhancement encoder corresponding to those of FIG. 3. The base layer employs an interlaced signal derived from the progressive original and the enhancement layer employs progressive signal at full resolution. The picture structure for this encoder is shown in FIG. 16.

High resolution and high frame rate video enters on bus e12i100. The decimator e12i110 is a progressive to interlace converter according to FIG. 36 and FIG. 4 as described earlier; its output is routed to bus e12h120 while the undecimated progressive source is input as is to the enhancement encoder. The interpolator e12i450 performs the inverse operation of the decimator, ie. interlace to progressive conversion; this operation is explained earlier according to FIG. 37.

The operation of base encoder follows exactly the description of FIG. 19, the only difference being that the input to base encoder is interlaced rather than the progressive input as in FIG. 19.

The enhancement encoder is quite similar to that of FIG. 18, the only difference being that it operates at twice the frame rate of base encoder.

ORG e12i470 reorders pairs of high resolution video frames to match the order of each base layer frame and outputs the result on buses e12i480 and e12i485. It is important to notice that the base layer here processes interlaced frames that appear at half the frame rate of the enhancement layer.

The output of the base encoder, comprising interlaced frames, is available at bus e12i440 and passes through interlaced to progressive converter e12i450. The resulting signal on line e12i460 is applied to a switch e12i605 whose output e12i860 either passes directly to a next switch e12i880 or to a frame store e12i620 and on to bus e12i870 as the second input to switch e12i880. This is so because, after interlaced to progressive conversion, each interlaced frame results in two progressive frames, only one of which can be output directly on line e12i890 while the other one is stored for prediction of a next enhancement layer picture by storing it in e12i620 until it is needed.

Subtractor e12i490 computes the difference between the input picture on bus e12i480 that is to be coded and the prediction picture on bus e12i890. The prediction error is output on bus e12i500, transformed by transformer e12i510, quantized by quantizer e12i530, and passed via bus e12i540 to variable encoder e12i550. The quantizer step size used by the enhancement encoder is computed by quantization adapter e12i600 depending on the two buffer fullnesses on buses e12i350 and e12i590. The step size passes via bus e12i610 to quantizer e12i600 and to variable encoder e12i550 via bus e12i615. Variable encoder e12i550 encodes quantized transform coefficients input on bus e12i540 and quantizer step sizes qs input on bus e12i615 into a typically variable bit-rate bit-stream that is output on bus e12i560. As mentioned earlier, the prediction picture for first of each pair of progressive frames on bus e12i480 comes directly from bus e12i860, and for the second progressive frame from bus e12i870. This process is repeated for subsequent frames.

Figure 17:
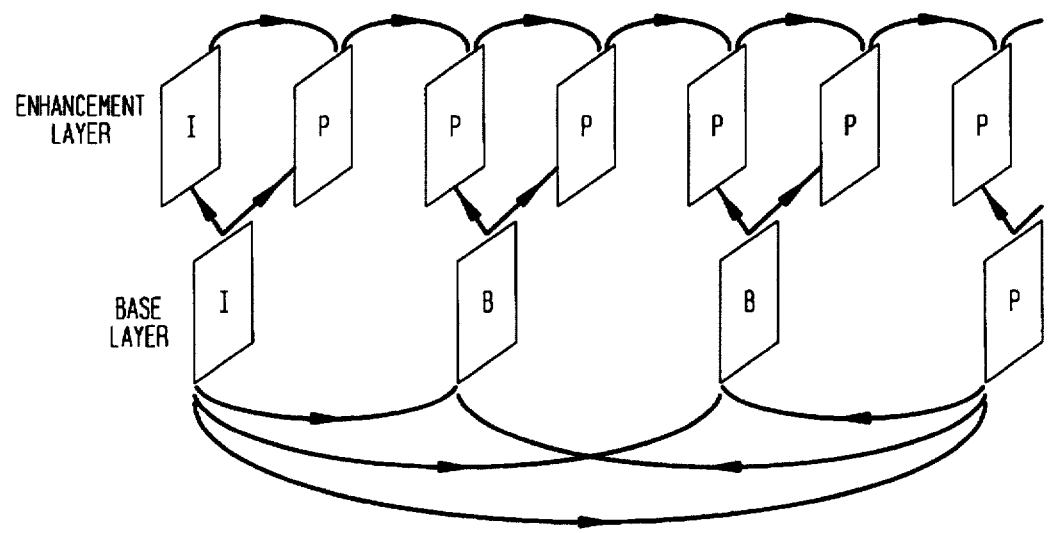
FIG. 17 is a picture structure for a base layer with M=3, and an enhancement layer with M=1 and unidirectional prediction from the base layer at twice the picture rate of base layer, arranged in accordance with the principles of this invention.
Figure 25:
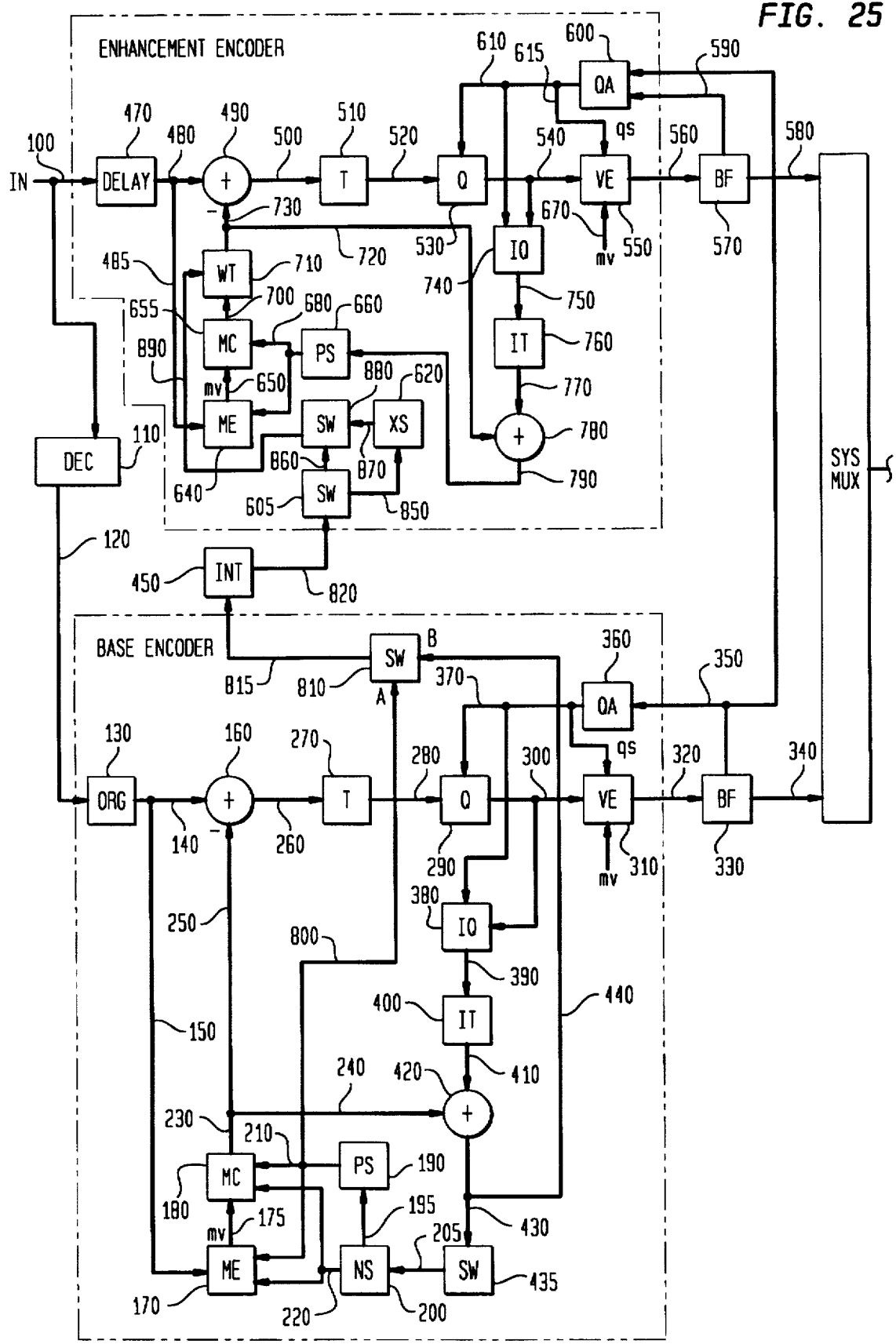
FIG. 25 is a block diagram of a two layer encoder for a base layer with M=3, and an enhancement layer with M=1 and unidirectional prediction from the base layer at twice the picture rate of base layer, arranged in accordance with the principles of this invention.

FIG. 25 shows an example of a base encoder and an enhancement encoder corresponding to those of FIG. 3. The base layer employs an interlaced signal derived from the progressive original and the enhancement layer employs progressive signal at full resolution. The picture structure for this encoder is shown in FIG. 17.

High resolution and high frame rate video enters on bus e12j100. The decimator e12j110 is a progressive to interlace converter according to FIG. 36 and FIG. 4 as described earlier; its output is routed to bus e12j120 while the undecimated progressive source is input as is to the enhancement encoder. The interpolator e12j450 performs the inverse operation of the decimator, i.e., interlace to progressive conversion; this operation is explained earlier according to FIG. 37.

The operation of base encoder follows exactly the description of FIG. 20, the only difference being that the input to the base encoder is interlaced rather then the progressive input as in FIG. 20.

Delay e12j470 delays the high resolution video frames at the input of the enhancement encoder. It is important to notice that the base layer here processes interlaced frames that appear at half the frame rate of enhancement layer.

The enhancement encoder is an extension of encoder of FIG. 18 and uses not only the prediction from the base layer but also uses motion compensated prediction from the enhancement layer as in FIG. 20. Moreover, it operates at twice the frame rate of base encoder in FIG. 24.

The output of the base encoder, comprising interlaced frames is available at bus e12j440 and passes through interlaced to progressive converter e12j450. The resulting signal on line e12j460 is applied to a switch e12j605 whose output e12j860 either passes directly to a next switch e12j880 or to frame store e12j620 and on to bus e12j870 as the second input to switch e12j880. This is so because, after interlaced to progressive conversion, each interlaced frame results in two progressive frames, only one of which can be output directly on line e12j890 while the other one is stored for prediction of a next enhancement layer picture by storing it in e12j620 until it is needed.

Reordering of frames of the base layer is accomplished via a switch e12j810. After the encoding of a B type frame in the base layer, switch e12j810 is in the "B" position and routes the B-frame from the output of adder e12j420 via bus e12j440 to its output on bus e12j815. During the encoding of I and P type frames in the base layer, switch e12j810 is in the "A" position and routes previously coded frames from bus e12j210 via bus e12j800 so that they match temporally with the frame being encoded in the enhancement layer.

As mentioned earlier, the enhancement layer video on bus e12j100 is not reordered prior to encoding. Thus, delay e12d470 delays the enhancement layer video on bus e12j100 in order to temporally match the replica decoded base layer video on bus e12j815. The delayed enhancement layer video passes to subtractor e12j490 and motion estimater e12j640 via buses e12j480 and e12j485, respectively.

The base layer prediction picture on bus e12j815 enters interlace to progressive interpolator e12j450 and then to bus e12j820 which is applied to a switch e12j605 whose output e12j660 either passes directly to a next switch e12j880 or to a frame store e12j620 and on to bus e12j670 as the second input to a switch e12j880.

Motion estimator e12j640 examines the enhancement layer input frame on bus e12j485 and compares it with the previously coded enhancement layer frame on bus e12j680 to compute additional motion vectors. Motion estimator e12j640 outputs these additional motion vectors also on bus e12j650 for use by motion compensator e12j655 and for use by variable encoder e12j550. Motion compensator e12j655 utilizes these motion vectors and pels from the enhancement layer prediction frame on bus e12j680 to compute motion compensated prediction that passes to weighter e12j710 on bus e12j700.

Weighter e12j710 computes a weighted average of the two predictions input on buses e12j890 and e12j700 as described for the encoder of FIG. 20.

The remaining operations of the enhancement encoding are identical to those of the base layer, except for the quantization adaptation e12j600 which operates in exactly the same way as in FIGS. 18 and 19.

Figure 26:
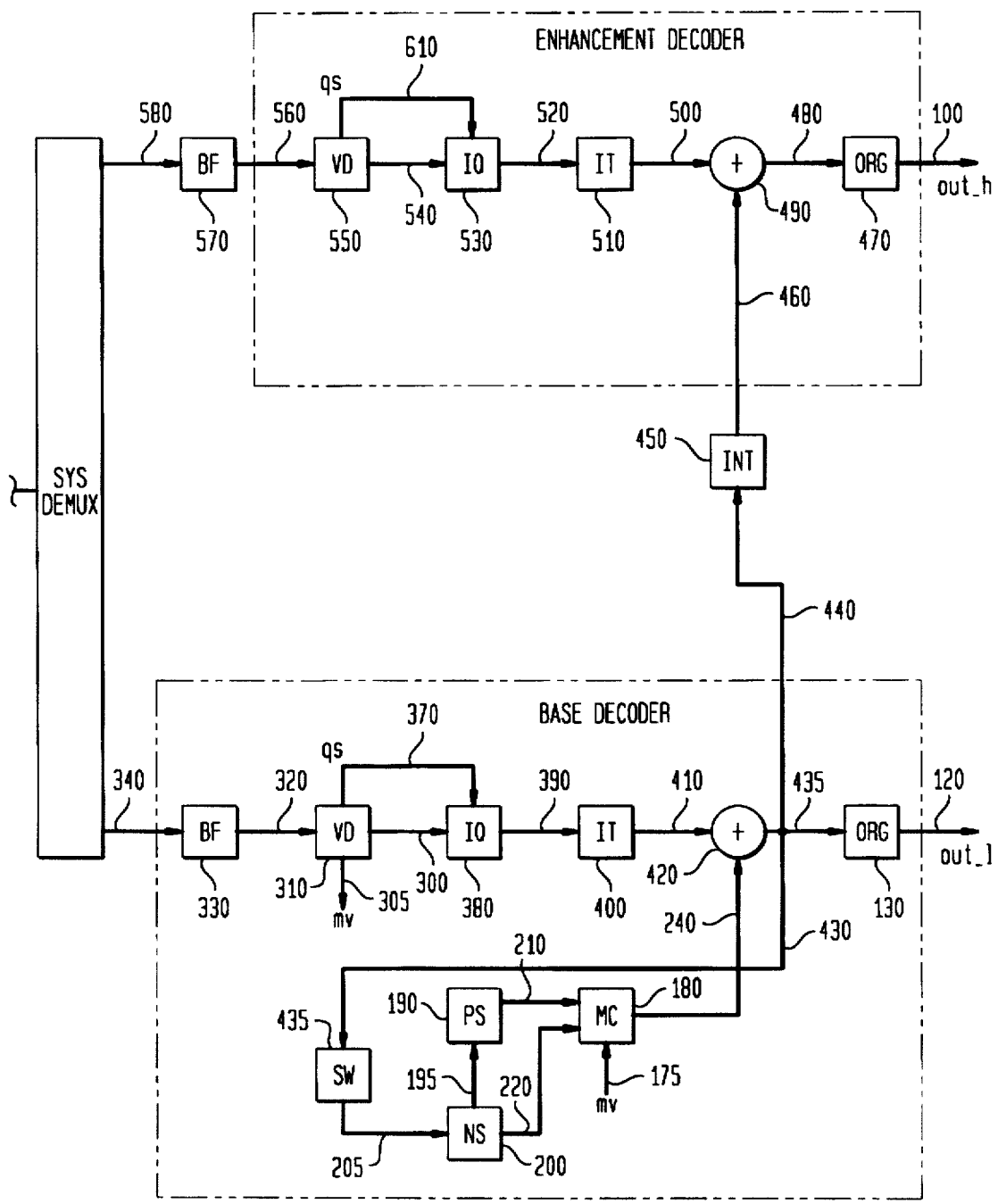
FIG. 26 is a block diagram of a two layer decoder for base layer with M=3, and an enhancement layer with I-pictures spatial prediction, arranged in accordance with the principles of this invention.

FIG. 26 shows an example of base decoder and an enhancement decoder corresponding to those of FIG. 1.

The base decoder may be an MPEG decoder, which for generality is shown as decoding I, B and P pictures according to the structure of FIG. 10. The received bit-stream on bus d12a340 passes from the systems demultiplexer to a buffer d12a330 for temporary storage until it passes via bus d12a320 to a variable decoder d12a310.

Variable decoder d12a310 decodes quantized transform coefficients which are then output on bus d12a300, quantizer step sizes qs which are then output on bus d12a370, and motion vectors which are then output on buses d12a175 and d12a305.

Motion compensator d12a180 utilizes the motion vectors on bus d12a175 and pels from previously decoded frames on buses d12a210 and d12a220 to compute (for P and B type frames) a motion compensated prediction that is output on bus d12a240. For I type frames, motion compensator d12a180 outputs zero pel values.

Qs signals pass from variable decoder d12a310 via bus d12a370 to inverse quantizer d12a380.

Quantized transform coefficients pass on bus d12a300 from variable decoder d12a310 to inverse quantizer d12a380. inverse quantizer d12a380 converts the quantized transform coefficients back to full range and passes the result via bus d12a390 to inverse transform d12a400, which outputs pel prediction error values on bus d12a410. Adder d12a420 adds the prediction error values on bus d12a410 to the prediction values on bus d12a240 to form the decoded base layer pels on buses d12a430, d12a435, and d12a440.

For I and P type frames, switch d12a435 passes the decoded pels on bus d12a430 via bus d12a205 to the nextpicture store d12a200. Simultaneously, the frame that was in nextpicture store d12a200 passes via bus d12a195 to previouspicture store d12a190. For B type frames, switch d12a435 takes no action, and the contents of picture stores d12a190 and d12a200 remain unchanged.

The contents of picture stores d12a190 and d12a200 pass to motion estimator d12a170 and motion compensator d12a180 via buses d12a210 and d12a220 for use as needed by those elements.

ORG d12a130 reorders the base layer decoded output frames on bus d12a435 in preparation for display on bus d12a120.

The decoded base layer frames pass via bus d12a440 to interpolator d12a450, where they are upsampled and passed to the enhancement decoder via bus d12a460.

As described herein above, the enhancement layer bit-stream passes from the Systems Demultiplexer to buffer d12a570 via bus d12a580 for temporary storage until it passes via bus d12a560 to the Variable Decoder d12a550.

Variable decoder d12a550 decodes quantized transform coefficients output on bus d12a540 and quantizer step sizes qs output on bus d12a610. Quantizer step sizes qs pass from bus d12a610 to inverse quantizer d12a530.

Quantized transform coefficients pass on bus d12a540 from variable decoder d12a550 to inverse quantizer d12a530. Inverse quantizer d12a530 converts the quantized transform coefficients on bus d12a540 back to full range and passes the result via bus d12a520 to inverse transform d12a510, which outputs pel prediction error values on bus d12a500. Adder d12a490 adds the prediction error values on bus d12a500 to the prediction values on bus d12a460 to form the decoded enhancement layer pels on bus d12a480.

ORG d12a470 reorders the high resolution video frames on bus d12a480 to match the order of the base layer and outputs the result on bus d12a100 for display.

High frame rate and high resolution progressive format video thus exits on bus d12a100.

Figure 27:
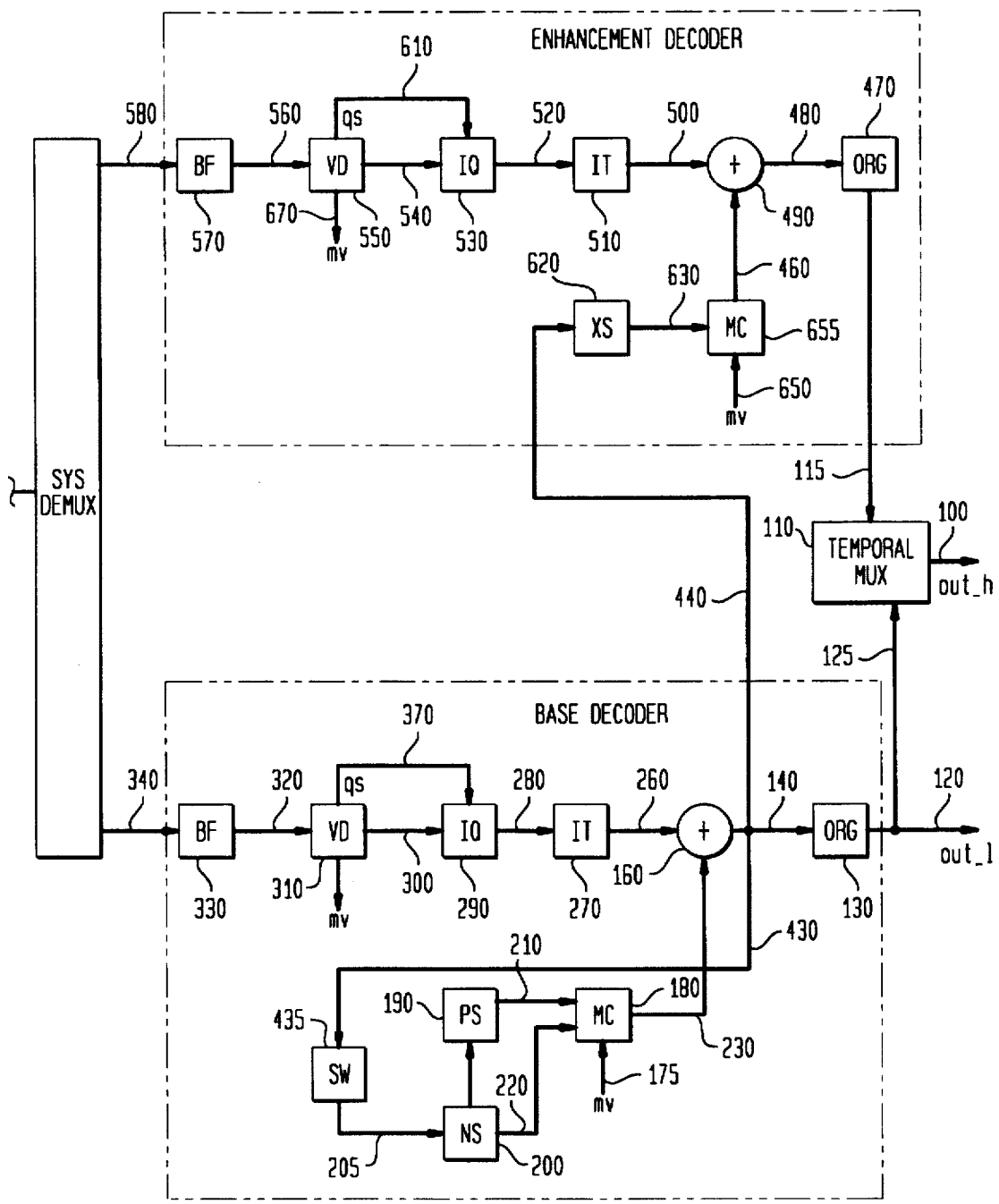
FIG. 27 is a block diagram of a two layer decoder for base layer with M=3, and an enhancement layer with I-pictures and unidirectional prediction from the base layer, arranged in accordance with the principles of this invention.

FIG. 27 shows a base decoder and an enhancement decoder corresponding to the encoder apparatus of FIG. 19. If coding is done following FIG. 2, both the base and enhancement layers use a progressive signal at full resolution, but at half the frame rate of the original. Alternately, if codec of FIG. 7 is employed, both the base and enhancement layer use interlaced signals. The picture structure for this decoder is shown in FIG. 12. For the purpose of illustrative explanation of the operation of FIG. 27, assume coding according to FIG. 2.

The base decoder of FIG. 27 operates in exactly the same way as the base decoder in FIG. 26, except that it decodes full resolution video at half the frame rate. A decoded base layer reordered video is output on buses d12b440, D12B140 an D12B430. The base layer video on bus 140 is reordered into camera order by ORG 130 and output on buses 120 and 125. The base layer video is passed to the base layer display via bus 120.

The enhancement decoder in FIG. 27 is similar to that of FIG. 26. However, in this case, the prediction picture on bus d126440 is temporally shifted from the video frames on bus d12b115 that are to be decoded.

The decoded base layer video is full resolution. Thus, there is no need for upsampling prior to delivery to the enhancement decoder. The base layer prediction picture on bus d12b440 first enters a transition store d12b620 whose contents are made available on bus d12b630 to motion compensator d12b655.

The enhancement layer bit-stream passes from the systems demultiplexer to buffer d12b570 via bus d12b580 for temporary storage until it passes via bus d12b560 to the variable decoder d12b550.

Variable decoder d12b550 decodes quantized transform coefficients which are output on bus d12b540, quantizer step sizes qs which are output on bus d12b610 and motion vectors which are output on buses d12b670 and d12b650. Quantizer step sizes qs pass from bus 610 to inverse quantizer 530.

Motion compensator d12b655 utilizes the enhancement layer motion vectors on bus d12b650 and pels from the base layer prediction frame on bus d12b630 to compute a motion compensated prediction that is output on bus d12b460 and passes to adder d12b490.

Quantized transform coefficients pass on bus d12b540 from variable decoder d12b550 to inverse quantizer d12b530. Inverse quantizer d12b530 converts the quantized transform coefficients on bus 540 back to full range and passes the result via bus d12b520 to inverse transform d12b510, which outputs pel prediction error values on bus d12b500. Adder d12b490 adds the prediction error values on bus d12b500 to the prediction values on bus d12b460 to form the decoded enhancement layer pels on bus d12b480.

ORG d12b470 reorders the high resolution video frames on bus 480 to match the order of the base layer and outputs the result on bus d12b115.

Temporal multiplexer d12b110 may be a simple switching mechanism that routes alternate frames of progressive input on buses d12b115 and d12b125, respectively, to output bus d12b100.

High resolution and high frame rate progressive format video thus exits on bus d12b100.

Figure 28:
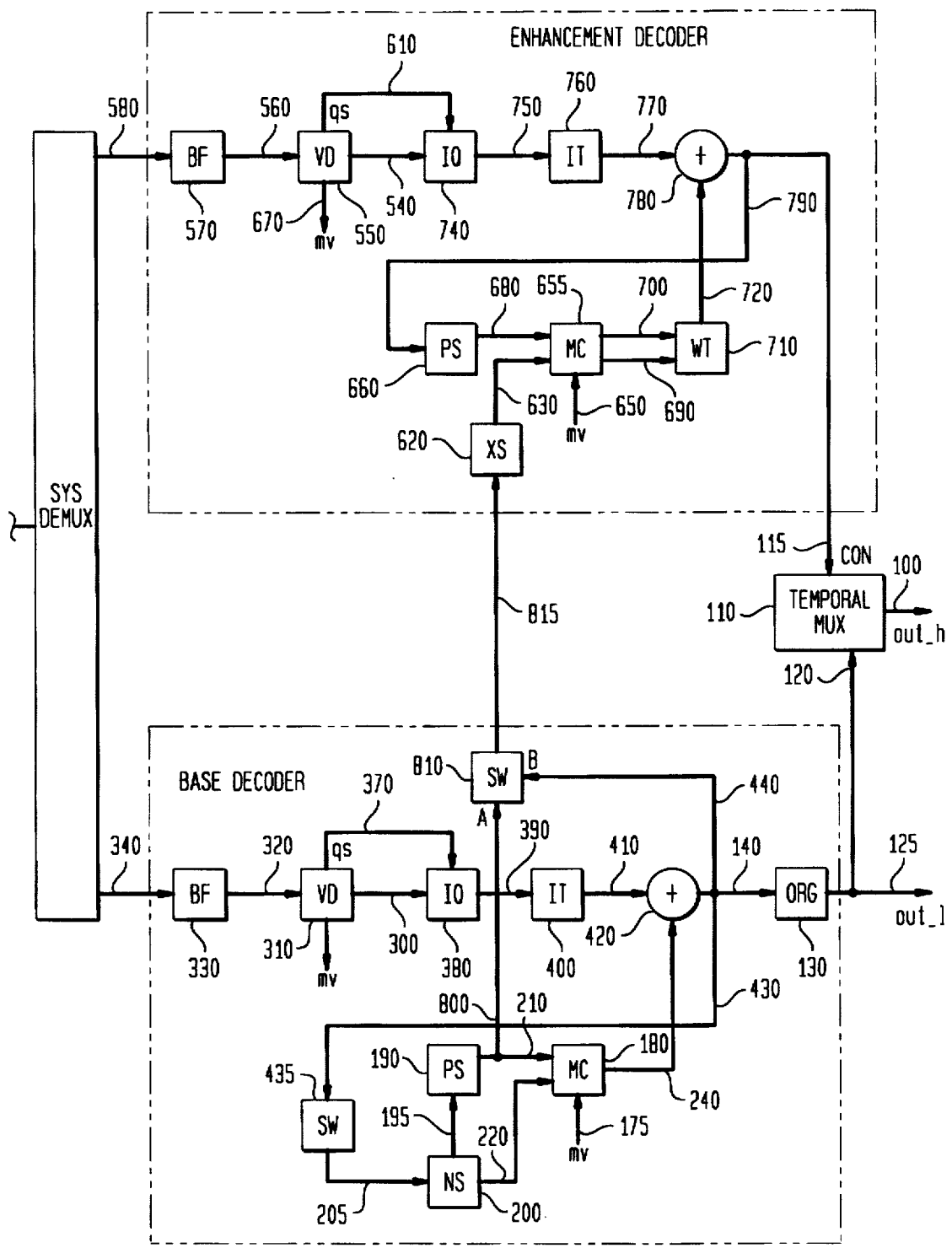
FIG. 28 is a block diagram of a two layer decoder for a base layer with M=3, and an enhancement layer with M=1 and unidirectional prediction from the base layer, arranged in accordance with the principles of this invention.

FIG. 28 shows an example of a base decoder and an enhancement decoder corresponding to the encoder apparatus of FIG. 20. If coding is done following FIG. 2, both the base and enhancement layers use a progressive signal at full resolution, but at half the frame rate of the original. Alternately, if codec of FIG. 7 is employed, both the base and enhancement layer use interlaced signal. The picture structure for this decoder is shown in FIG. 12. For the purpose of illustrative explanation of operation of FIG. 28, assume coding according to FIG. 2.

The Base Decoder of FIG. 28 operates in the same way as in FIG. 27, except for the reordering of the decoded base layer video, as mentioned above for the encoder e12d.

The enhancement decoder of FIG. 28 has several differences compared with that of FIG. 27, as mentioned above for encoder e12d. Since the enhancement layer video frames are not reordered prior to encoding, the decoded base layer frames that are to be used as predictions must be reordered by switch d12d810.

During the decoding of B type frames, switch d12d810 is in the "B" position and routes B-frames from the output of adder d12d420 via bus d12d440 to its output on bus d12d815. During the decoding of I and P type frames, switch d12d810 is in the "A" position and routes previously coded frames from bus d12d210 via bus d12d800 so that they match temporally with the frames being decoded in the enhancement layer. The base layer prediction picture on bus d12d815 enters transition store d12d620 whose contents are made available on bus d12d630 to motion compensator d12d655.

The enhancement layer bit-stream passes from the systems demultiplexer to buffer d12d570 via bus d12d580 for temporary storage until it passes via bus d12d560 to the variable decoder d12d550.

Variable decoder d12d550 decodes quantized transform coefficients and outputs them on bus d12d540, quantizer step sizes qs and outputs them on bus d12d610 and motion vectors and outputs them on buses d12d670 and d12d650. Quantizer step sizes qs pass from bus d12d610 to inverse quantizer d12d740. Motion compensator d12d655 utilizes the enhancement layer motion vectors on bus d12d650 and pels from the base layer prediction frame on bus d12d630 to compute a motion compensated prediction that is output on bus d12d690 and passed to weighter d12d710.

Motion compensator d12d655 also utilizes the enhancement layer motion vectors on bus d12d650 and pels from the previously decoded enhancement layer frame on bus d12d680 to compute a motion compensated prediction that is output on bus d12d700 and passed to weighter d12d710.

Weighter d12d710 computes a weighted average of the two predictions input on buses d12d690 and d12d700 and outputs the result on buses d12d720 and d12d730 to subtractor d12d490 and adder d12d780, respectively. The weighting used in computing the prediction is the same as was used during the encoding process.

The remaining operations of the enhancement decoding are identical to those of the Base Layer. Specifically, the quantized transform coefficients on bus d12d540 are converted to full range by inverse quantizer d12d740, converted to prediction error pel values by inverse transform d12d760, added to the motion compensated prediction on bus d12d720 by adder d12d780, and outputted on buses d12d790 and d12d115 as decoded enhancement layer video.

The video on bus d12d790 is passed to the previous frame store d12d660 for use in motion compensation of the next frame. The video on bus d12d115 is passed to the temporal multiplexer d12d110. Temporal demultiplexer d12d110 may be a simple switching mechanism that routes alternate frames of progressive input from input buses d12d115 and d12d120, respectively, to bus d12d100. High resolution video thus exits on bus d12d100.

Figure 29:
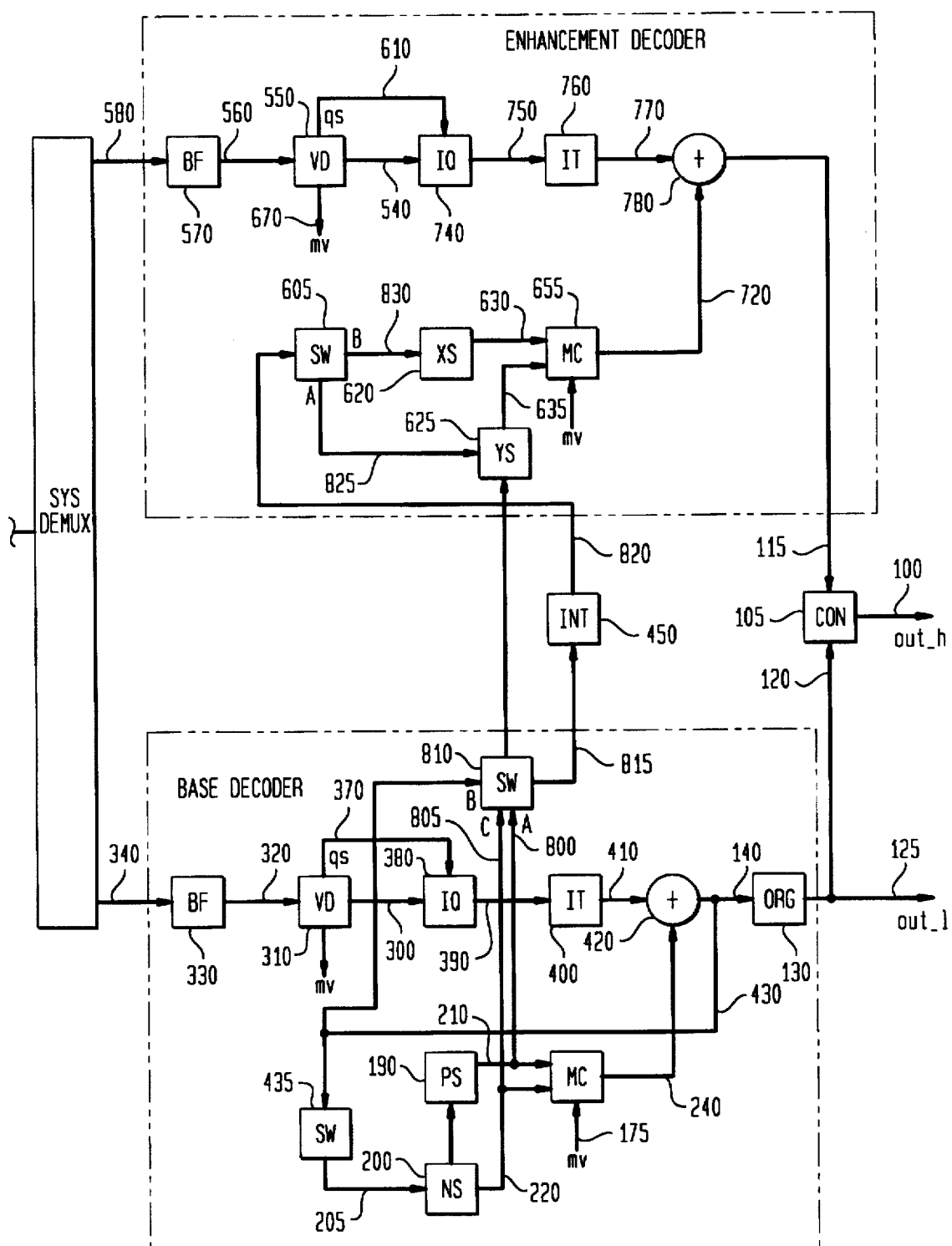
FIG. 29 is a block diagram of a two layer decoder for a base layer with M=3, and an enhancement layer with I-pictures and unidirectional prediction from the base layer, arranged in accordance with the principles of this invention.

FIG. 29 shows the base decoder and enhancement decoder corresponding to the encoder apparatus of FIG. 21. If coding is done following FIG. 2, both the base and enhancement layers use a progressive signal at full resolution, but at half the frame rate of the original. Alternately, if the codec of FIG. 7 is employed, both the base and enhancement layer use interlaced signal. The picture structure for this decoder is shown in FIG. 13. For the purpose of illustrative explanation of FIG. 29, assume coding according to FIG. 2.

The Base Decoder operates in the same way as in FIG. 28, except for the reordering of the decoded base layer video.

The operation of the enhancement decoder is similar to that of FIG. 27. Since the enhancement layer video frames are not reordered prior to encoding, the decoded base layer frames that are to be used as predictions must be reordered by switch d12d810.

The base layer prediction picture on bus d12e430, as well as contents of picture stores d12e190 and d12e200 on respective buses d12e800 and d12e805 are available at switch d12e810. Depending on the picture being decoded in the enhancement decoder, specific two out of three available base layer prediction frames at the input of switch d12e810 are necessary in the enhancement layer and pass via a 1:1 interpolator d12e450 to switch d12e605 and enter transition stores d12e620 and d12e625 both of whose contents are made available on bus d12e630 and bus d12e635 to motion compensator d12e655.

We refer to a pair of B frames between every pair of reference frames in the base layer of FIG. 13 as B1 and B2 frames, and frames of the enhancement layer as the first $I^2$ frame, the second $I^2$ frame, the third $I^2$ frame and so on. During the decoding of I and P type frames of the base layer, switch d12e810 is in the "A" position and routes previously coded frames from bus d12e210 through the switch d12e810 and bus d12e815 to bus d12e820 and further through switch d12e605 which is in "B" position to frame store d12e620. After the decoding of a B1 frame, switch d12e810 is in "B" position and routes the B1 frame from the output of adder d12e420 via bus d12e430 to its output on bus d12e815 and through the switch d12e605 which is in "A" position to frame store d12e625. At this time, decoding of the first $I^2$ frame is accomplished. After the decoding of a B2 frame, switch d12e810 is in "B" position and routes B2 frame from the output of adder d12e420 via bus d12e430 to its output on bus d12e815 and through the switch d12e605 which is in "B" position to frame store d12e620. Now the decoding of second $I^2$ frame is accomplished. At this time, to accomplish decoding of the third $I^2$ frame, contents of picture store d12e200 are routed on bus d12e805 and through switch d12e810 which is in the "C" position to switch d12e605 which is in the "A" position and to frame store d12e625. This process repeats itself for the coding of subsequent frames.

The remaining operations of enhancement decoding are identical to those of the base layer. Specifically, the quantized transform coefficients on bus d12e540 are converted to full range by inverse quantizer d12e740, converted to prediction error pel values by inverse transform d12e760, added to the motion compensated prediction on bus d12e720 by adder d12e780 and output on bus d12e115 as decoded enhancement layer video.

The video on bus d12e115 is passed to converter d12e105, a temporal multiplexer switching mechanism that routes alternate frames of progressive input video from buses d12e115 and d12e120, respectively. High resolution and high frame rate video exits on bus d12e100.

Figure 30:
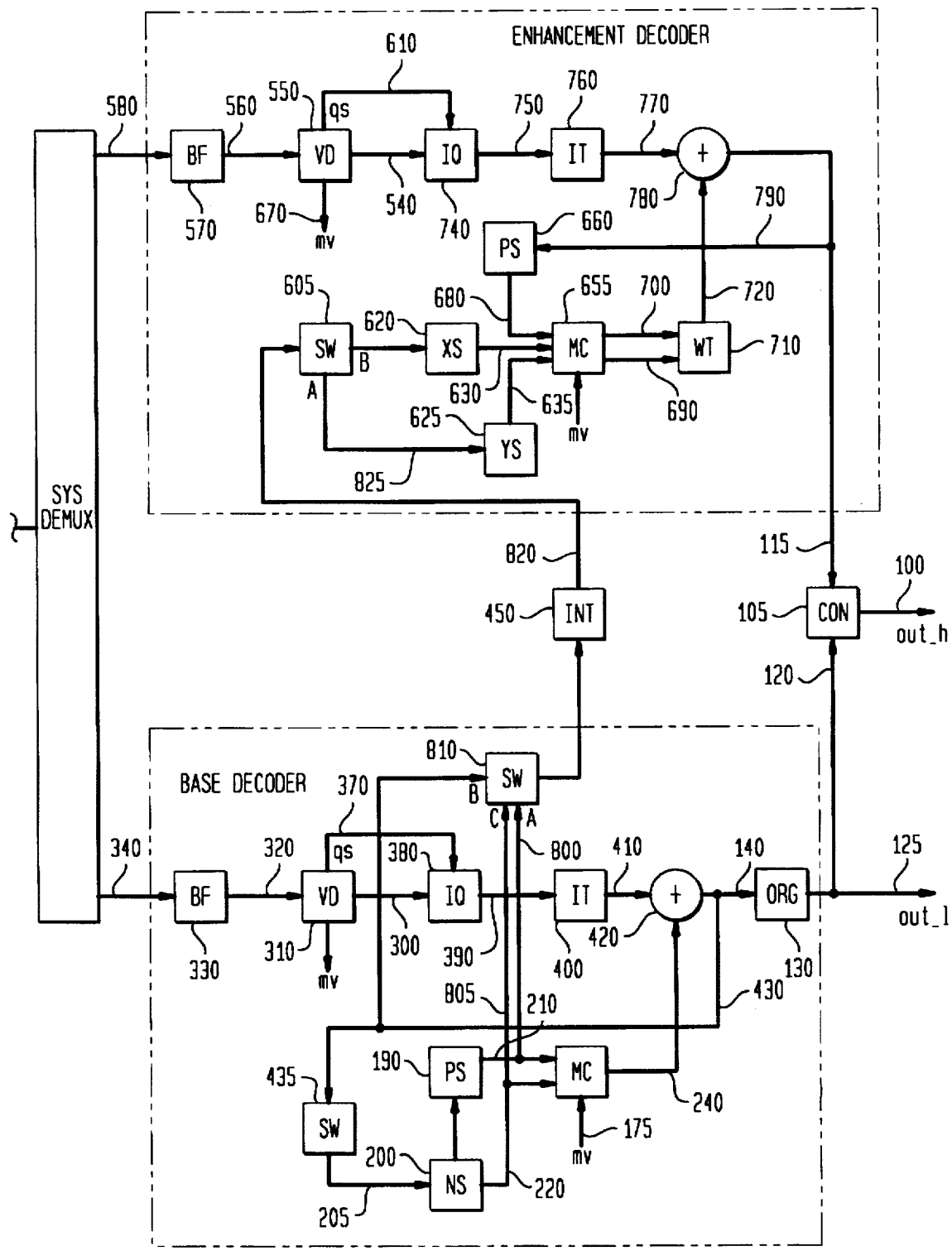
FIG. 30 is a block diagram of a two layer decoder for a base layer with M=3, and an enhancement layer with M=1 and bi-directional prediction from the base layer, arranged in accordance with the principles of this invention.

FIG. 30 shows the base decoder and enhancement decoder corresponding to the encoder apparatus of FIG. 22. If coding is done following FIG. 2, both the base and enhancement layers use a progressive signal at full resolution, but at half the frame rate of the original. Alternately, if codec of FIG. 7 is employed, both the base and enhancement layer use interlaced signals.

The picture structure for this decoder is shown in FIG. 14. For the purpose of illustrative explanation of FIG. 30, assume coding according to FIG. 2.

The base decoder operates in the same way as the base decoder in FIG. 29.

The enhancement decoder has a notable difference compared with the enhancement decoder of FIG. 29 since it uses not only base layer frames as predictions but also temporal prediction from the enhancement layer.

The base layer prediction picture on bus d12g430, as well as contents of picture stores d12g210 and d12g220 on respective buses d12g800 and d12g805 are available at switch d12g810. Depending on the picture being decoded in the enhancement decoder, specific two out of three available base layer prediction frames at the input of switch d12g810 are necessary in the enhancement layer and pass via a 1:1 interpolator d12g450 to a switch d12g605 and enter transition stores d12g620 and d12g625 both of whose contents are made available on bus d12g630 and bus d12g635 to motion estimator d12g640 and motion compensator d12g655.

In a manner similar to FIG. 29, we refer to a pair of B frames between every pair of reference frames in the base layer of FIG. 14 as B1 and B2 frames, and frames of the enhancement layer as the first $I^2$ frame, the first $P^2$ frame, the second $P^2$ frame, and so on. During the decoding of I and P type frames of the base layer, switch d12g810 is in the "A" position and routes previous decoded frame from bus d12g210 via bus d12g800 and through the switch d12g815 to bus d12g820 and further through switch d12g605 which is in "B" position to frame store d12g620. After the decoding of a B1 frame, switch d12g810 is in the "B" position and routes the B1 frame from the output of adder d12g420 via bus d12g440 to its output on bus d12g815 and through the switch d12g605 which is in the "A" position to frame store d12g625. At this time, decoding of the first $I^2$ frame is accomplished, the decoded frame appears via bus d12g790 and is stored in frame store d12g660 to be used for prediction the first $P^2$ frame. After the decoding of B2 frame, switch d12g810 is in the "B" position and routes B2 frame from the output of adder d12e420 via bus d12g440 to its output on bus d12g815 and through the switch d12g605 which is in the "B" position to a frame store d12g620. Now that the decoding of first $P^2$ frame is accomplished, the decoded frame appears via bus d12g790 and is stored in frame store d12g660 to be used for prediction of the second $P^2$ frame. At this time, to accomplish decoding of the second $P^2$ frame, the contents of picture store d12g200 are routed on bus d12g800 and through switch d12g810, which is in the "C" position, to switch d12g605, which is in the "A" position, and to frame store d12g625. The coded frame appears via bus d12g790 and is stored in frame store d12g660 to be used for prediction the next $P^2$ frame. This process repeats itself for coding of subsequent frames.

Weighter d12g710 computes a weighted average of the two predictions input on buses d12g690 and d12g700 and outputs the result on buses d12g720 and d12g730 to adder d12g780.

The remaining operations of the enhancement decoding are identical to those of the base layer. Specifically, the quantized transform coefficients on bus d12g540 are converted to full range by inverse quantizer d12g740, converted to prediction error pel values by inverse transform d12g760, added to the motion compensated prediction on bus d12g720 by adder d12g780 and output on bus d12g480, after which, frames are reordered in d12g470 and output on d12g115 as decoded enhancement layer video.

The video on bus d12e115 is passed to converter d12e105, a temporal multiplexer switch that routes alternate frames of progressive input video from buses d12e115 and d12e120, respectively. High resolution and high frame rate video exits on bus d12e100.

Figure 31:
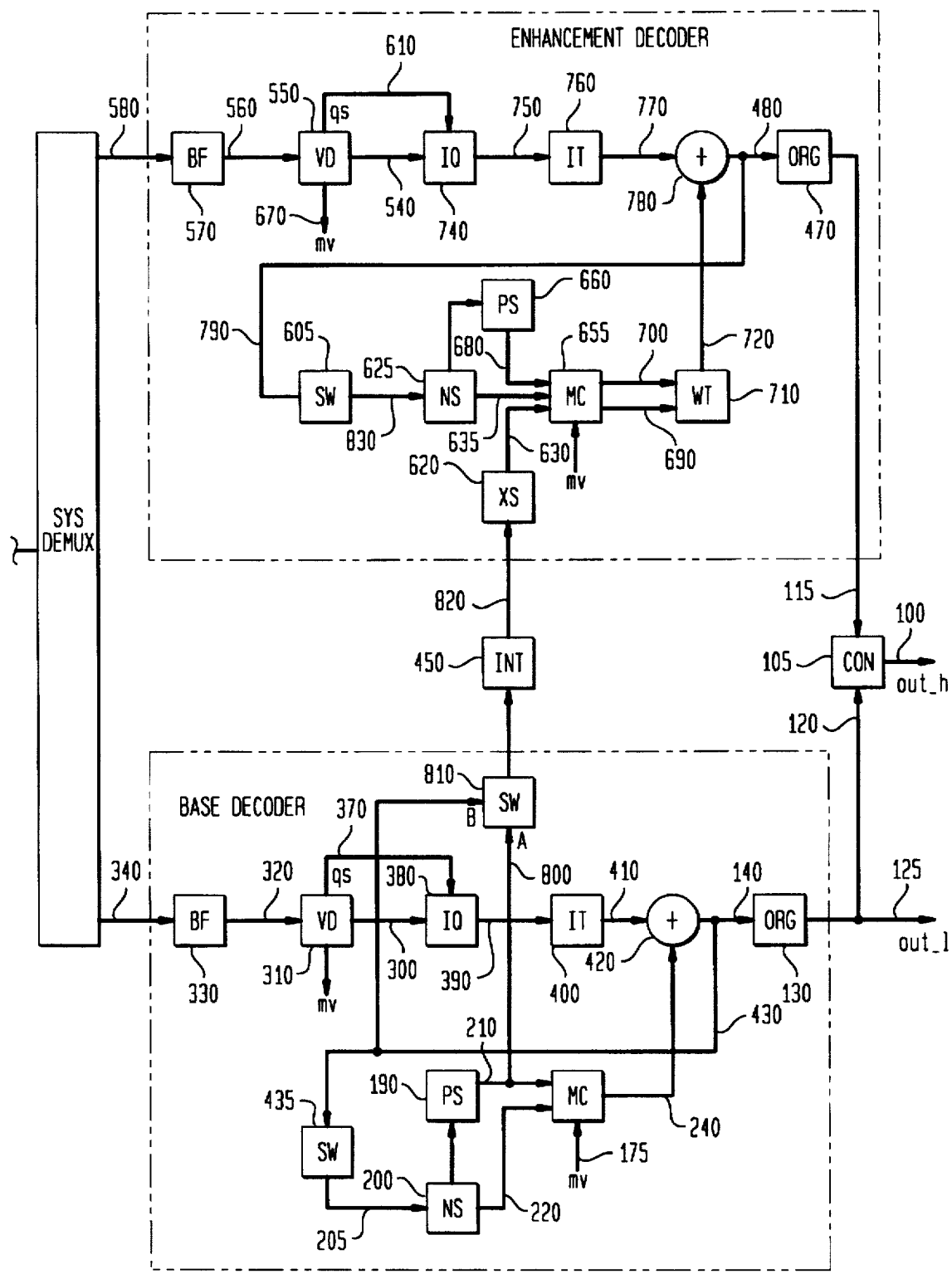
FIG. 31 is a block diagram of a two layer decoder for a base layer with M=3, and an enhancement layer with M=3 and unidirectional prediction from the base layer, arranged in accordance with the principles of this invention.

FIG. 31 shows the base decoder and enhancement decoder corresponding to the encoder apparatus of FIG. 23. If coding is done following FIG. 2, both the base and enhancement layers use a progressive signal at full resolution, but at half the frame rate of the original. Alternately, if codec of FIG. 7 is employed, both the base and enhancement layer use interlaced signals. The picture structure for this decoder is shown in FIG. 15. For the purpose of illustrative explanation of FIG. 31, we assume coding according to FIG. 2.

The base decoder operates in the same way as the base decoder in FIG. 28.

The enhancement decoder has a very similar operation to that of the base decoder, except that it uses a weighted combination of motion compensated prediction from the enhancement layer with motion compensated prediction from the base layer.

Motion compensator d12h655 utilizes the decoded motion vectors, and pels from the base layer prediction frame, to compute a motion compensated prediction that is output on bus d12h690 and passes to weighter d12h710 on bus d12h690. Motion compensator d12h655 also utilizes decoded motion vectors, and pels from the enhancement layer prediction frame, on bus e12h680, to compute another motion compensated prediction that passes to weighter e12h710 on bus e12h700.

Weighter d12h710 computes a weighted average of the two predictions input on buses d12h690 and d12h700 and outputs the result on buses d12h720 to adder d12h780.

The remaining operations of enhancement decoding are identical to those of the base layer. Specifically, the quantized transform coefficients on bus d12h540 are converted to full range by inverse quantizer d12h740, converted to prediction error pel values by inverse transform d12h760, added to the motion compensated prediction on bus d12h720 by adder d12h780 and output on bus d12h480, after which, frames are reordered in d12h470 and output on d12g115 as decoded enhancement layer video.

The video on bus d12e115 is passed to converter d12e105, a temporal multiplexer switch that routes alternate frames of progressive input video from buses d12e115 and d12e120, respectively. High resolution and high frame video exits on bus d12e100.

Figure 32:
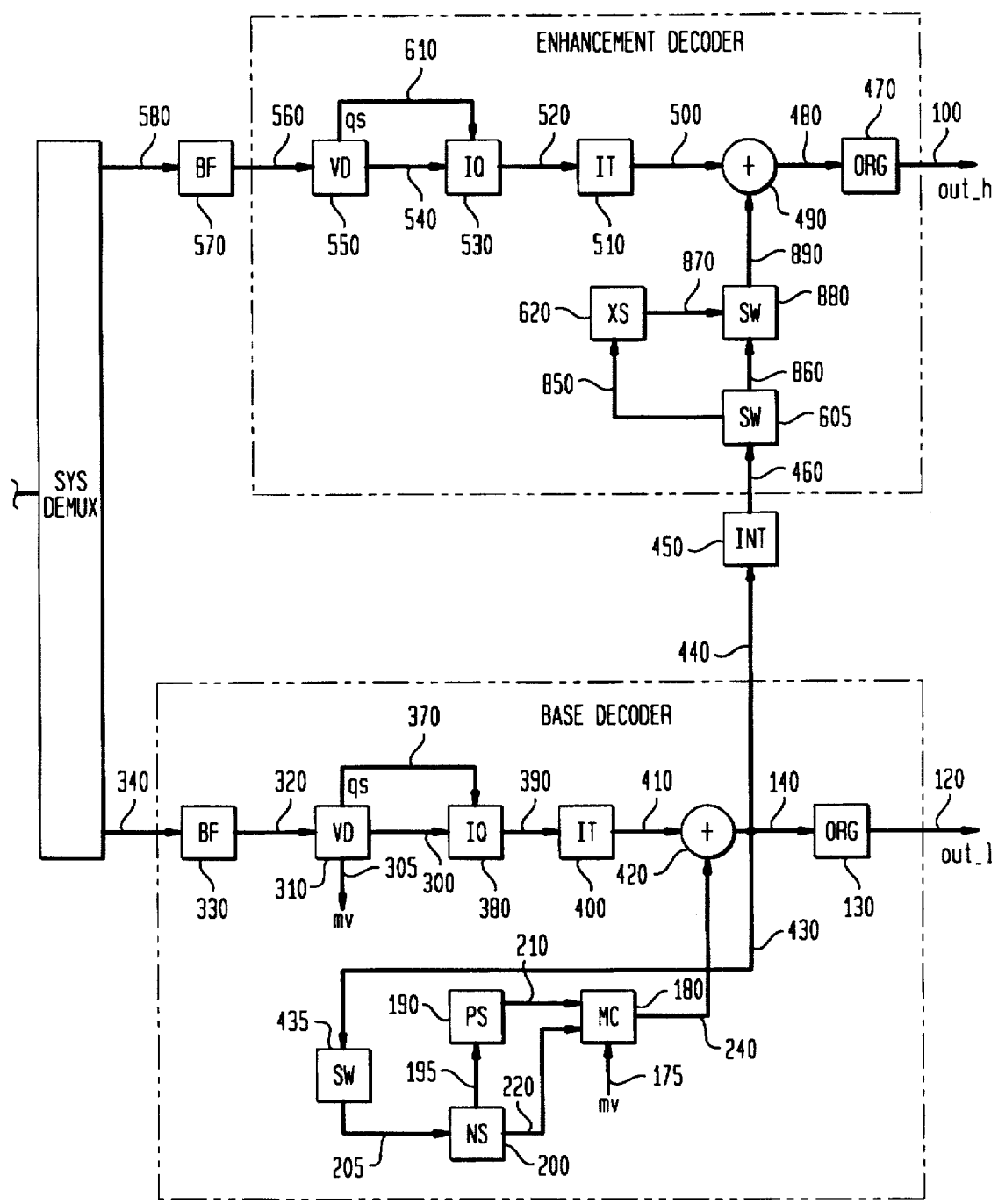
FIG. 32 is a block diagram of a two layer decoder for a base layer with M=3, and an enhancement layer with I-pictures spatial prediction at twice the picture rate of the base layer, arranged in accordance with the principles of this invention.

FIG. 32 shows the base decoder and enhancement decoder corresponding to the encoder apparatus of FIG. 24. Coding is done following FIG. 3. The base layer thus uses interlaced signals derived from the progressive original and the enhancement layer uses a full resolution progressive original. The picture structure for this decoder is shown in FIG. 16.

The operation of the base decoder in FIG. 32 follows exactly the description of FIG. 27, the only difference being that the output of the base decoder in FIG. 32 is interlaced rather then the progressive video as in FIG. 27.

The base layer prediction picture on bus d12i440 enters interlace to progressive interpolator d12i450 and then to bus d12i460 which is applied to a switch d12i605 whose output d12i860 either passes directly to next switch d12i880 or to frame store d12i620 and on to bus d12i870 as the second input to switch d12i880.

The operation of enhancement decoder is quite similar to that of FIG. 26, one notable difference being that it operates at twice the frame rate of the base decoder.

High resolution and high frame rate video exits on bus d12i100.

Figure 33:
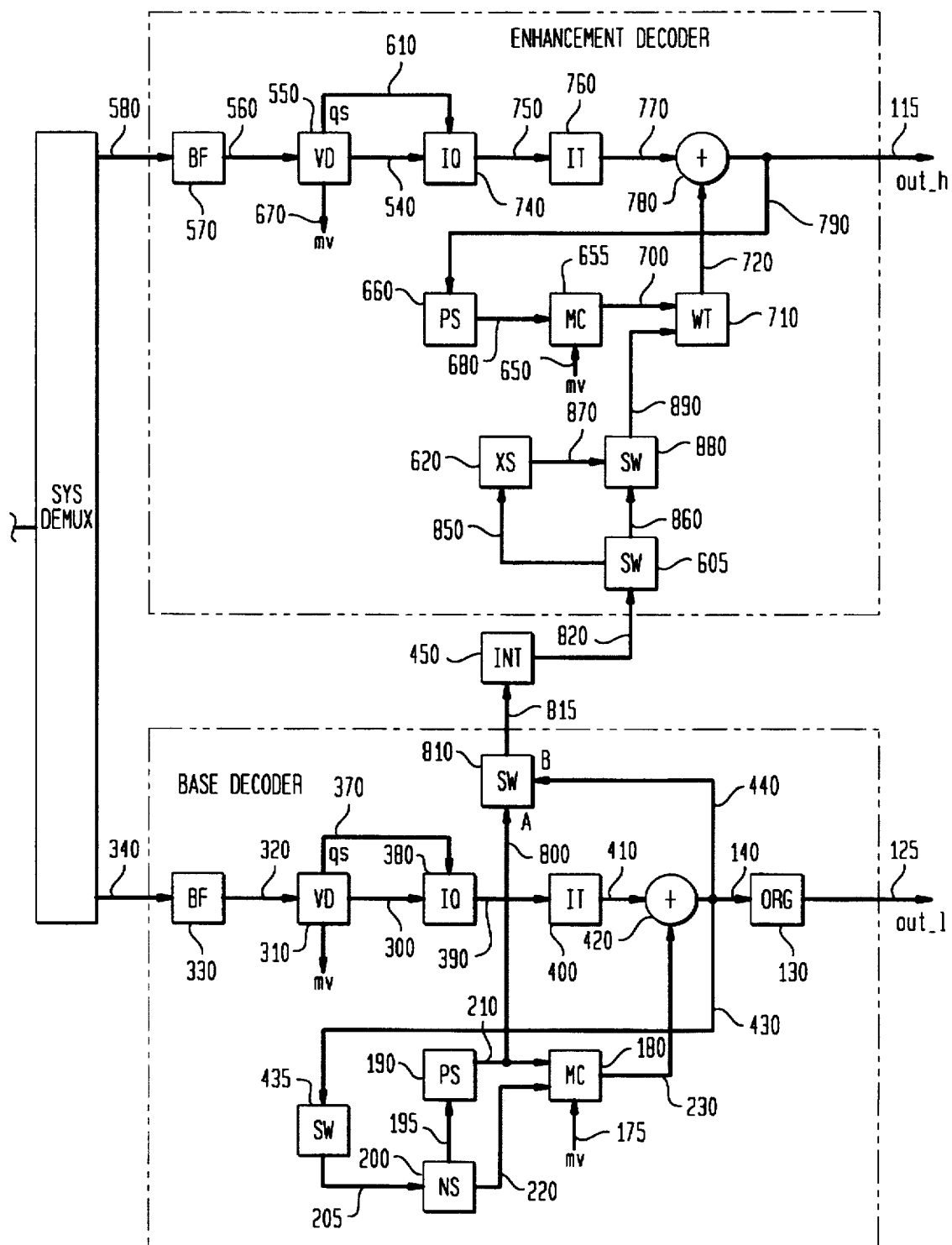
FIG. 33 is a block diagram of a two layer decoder for a base layer with M=3, and an enhancement layer with M=1 and unidirectional prediction from the base layer at twice the picture rate of base layer, arranged in accordance with the principles of this invention.

FIG. 33 shows the base decoder and enhancement decoder corresponding to the encoder apparatus of FIG. 25. Coding is done following FIG. 3. The base layer thus uses interlaced signals derived from the progressive original and the enhancement layer uses a full resolution original. The picture structure for this decoder is shown in FIG. 17.

The operation of this base decoder follows exactly the description of the base decoder of FIG. 28, the only difference being that the output of the base decoder is interlaced rather than the progressive output as in FIG. 28.

Reordering of frames of the base layer is accomplished via switch d12j810. After the encoding of a B type frame in the base layer, switch d12j810 is in the "B" position and routes the B-frame from the output of adder e12j420 via bus e12j440 to its output on bus e12j815. During the encoding of I and P type frames in the base layer, switch e12j810 is in the "A" position and routes previously coded frames from bus e12j210 via bus e12j800 so that they match temporally with the frame being encoded in the enhancement layer.

The base layer prediction picture on bus d12j815 enters interlace to progressive interpolator d12j450 and then is directed to bus d12j820 which is applied to a switch d12j605 whose output d12j860 either passes directly to next switch d12j880 or to frame store d12j620 and then on to bus d12j870 as the second input to switch d12j880.

Motion compensator d12j655 utilizes decoded motion vectors and pels from the enhancement layer prediction frame on bus d12j680 to compute a motion compensated prediction that passes to weighter d12j710 on bus d12j700.

Weighter d12j710 computes a weighted average of the two predictions input on buses d12j890 and d12j700 as described for decoder of FIG. 28.

The operation of enhancement decoder is quite similar to that of FIG. 28, one notable difference being that it operates at twice the frame rate of the base decoder.

High resolution and high frame rate video exits on bus d12j115.

In MPEG terminology, three basic types of pictures, I(Intra), P- (Unidirectional Predictive) and B- (Bidirectional Predictive) pictures are allowed. A picture structure is an arrangement of these picture types, and is identified by value of 'M', the distance between a P-picture and previous decoded reference picture, which is a P-picture except at the beginning of a Group-of-Pictures (GOP) where it is an I-picture. The value of 'N', the distance between corresponding I-pictures gives the length of a GOP. B-pictures are predicted noncausally and are outside the interframe coding loop of P-pictures. B-pictures are predicted using two references, an immediate previous decoded I- or P-picture, and an immediate next decoded P- or I-picture. The number of B-pictures between two reference pictures is given by value of 'M−1'.

FIG. 10 shows picture structures for the base and the enhancement layers; the corresponding structures are applied to the base and the enhancement layer encoders. The base layer employs M=3 structure with two B-pictures between the previous and the next reference pictures. The enhancement layer simply consists of I-pictures (no temporal prediction within the same layer) but uses spatially interpolated base layer pictures for prediction. The base and the enhancement layer pictures occur at exactly the same temporal instants.

The picture arrangement of FIG. 10 can be used, for example, for migration to progressive 960 line, 60 Hz frame rate video. A general block diagram of a codec employing this picture arrangement is shown in FIG. 1. The base layer in that example uses progressive format 720 line, 60 Hz frame rate video, and the enhancement layer uses progressive format 960 line, 60 H frame rate. Each base layer decoded picture is upsampled by a factor of 3:4 to yield prediction for each picture of the enhancement layer. The enhancement layer consists of I-pictures only with no temporal prediction of pictures within this layer.

We extend the concept of I-pictures of MPEG to what we shall call $I^1$-pictures for the enhancement layer. The $I^1$-pictures are like I-pictures in the sense that they do not employ temporal prediction within the same layer. However, they do employ motion compensated unidirectional prediction from the base layer.

FIG. 11 shows picture structures for the base and the enhancement layers; the corresponding structures are applied to the base and the enhancement layer encoders. The base layer employs M=3 structure with two B-pictures between the previous and the next reference pictures. The enhancement layer simply consists of $I^1$-pictures (no temporal prediction within the same layer) but uses the immediate previous base layer picture as reference for motion-compensated prediction.

The picture arrangement of FIG. 11 also can be used for migration to progressive 960 line, 60 Hz video. A general block diagram of codecs employing this picture arrangement is shown in FIG. 2 and FIG. 7. In FIG. 2, the base layer uses progressive 960 line, 30 Hz, obtained by selecting only the even numbered frames from 60 Hz source, and the enhancement layer uses progressive 960 line, 30 Hz, obtained by selecting the odd numbered frames; the enhancement layer pictures thus occur at intermediate temporal instants of the base layer pictures. In FIG. 7, the base layer and enhancement layers both use interlaced 960 line, obtained by either fixed or adaptive progressive-to-two interlace conversion from 60 Hz progressive source. The enhancement layer pictures occur at same temporal frame instants as the base layer pictures though their field order in each frame is complementary to that in base layer. For notational convenience, base layer pictures are labeled as even numbered frames and enhancement layer pictures as odd numbered frames. Each base layer decoded picture is used for prediction of the next picture in the enhancement layer. The enhancement layer consists of $I^1$-pictures only with no temporal prediction of pictures within this layer.

We can extend the concept of P-pictures of MPEG to what we call $P^1$-pictures for the enhancement layer. The $P^1$-pictures are like P-pictures in the sense that they employ unidirectional temporal prediction within the same layer. They, however, also employ motion compensated unidirectional prediction from the base layer.

FIG. 12 shows picture structures for the base and the enhancement layers; the corresponding structures are applied to the base and the enhancement layer encoders. The base layer in this example employs M=3 structure with two B-pictures between the previous and the next reference pictures. The enhancement layer uses M=1, with first picture an $I^1$-picture and uses unidirectional motion compensated prediction with respect to previous base layer decoded picture. The remaining pictures are simply $P^1$-pictures and use not only motion compensated prediction within the same layer but also motion-compensated prediction with immediate previous base layer picture as reference.

As in the other picture arrangements described above, the picture arrangement of FIG. 12 can be used for migration to progressive 960 line, 60 Hz video. A general block diagram of codecs employing this picture arrangement is shown in FIG. 2 and FIG. 7. In FIG. 2, the base layer uses progressive, 960 line, 30 Hz, obtained by selecting only the even numbered frames from 60 Hz source. The enhancement layer uses progressive, 960 line, 30 Hz, obtained by selecting the odd numbered frames. The enhancement layer pictures thus occur at intermediate temporal instants of the base layer pictures. In FIG. 7, the base layer and enhancement layers both use interlaced 960 line video, obtained by either fixed or adaptive progressive-to-two interlace conversion from 60 Hz progressive source. The enhancement layer pictures occur at same temporal frame instants as the base layer pictures though their field order in each frame is complementary to that in base layer. For notational convenience, base layer pictures are labeled as even numbered frames and enhancement layer pictures as odd numbered frames. Each base layer decoded picture is used for prediction of the next picture in the enhancement layer. The enhancement layer consists of M=1 with $I^1$- and $P^1$-pictures. The $P^1$-pictures, benefit from two predictions, motion compensated prediction with respect to the immediately previous odd-numbered decoded picture in the same layer as well as motion compensated prediction from the immediately previous even-numbered decoded picture in the base layer.

We now extend the concept of $I^1$-pictures introduced above for enhancement layer to what we call $I^2$-pictures. The $I^2$-pictures like $I^1$-pictures do not employ temporal prediction within the same layer, however, they differ as they employ motion compensated bi-directional prediction instead of unidirectional prediction from the base layer.

FIG. 13 shows such picture structures for the base and the enhancement layers; the corresponding structures are applied to the base and the enhancement layer encoders. The base layer employs M=3 structure with two B-pictures between the previous and the next reference pictures. The enhancement layer simply consists of $I^2$-pictures (no temporal prediction within the same layer) but uses the immediate previous and the immediate next decoded base layer pictures as reference for motion-compensated prediction.

The picture arrangement of FIG. 13 can be used for migration to progressive, 960 line, 60 Hz video. A general block diagram of codecs employing this picture arrangement is shown in FIG. 2 and FIG. 7. In FIG. 2, the base layer uses progressive 960 line, 30 Hz video, obtained by selecting only the even numbered frames from a 60 Hz source. The enhancement layer uses progressive, 960 line, 30 Hz video, obtained by selecting the odd numbered frames from that 60 Hz source. The enhancement layer pictures thus occur at intermediate temporal instants of the base layer pictures. In FIG. 7, the base layer and enhancement layers both use interlaced 960 line, obtained by either fixed or adaptive progressive-to-two interlace conversion from 60 Hz progressive source. The enhancement layer pictures occur at same temporal frame instants as the base layer pictures though their field order in each frame is complementary to that in base layer. For notational convenience, base layer pictures are labeled as even numbered frames and enhancement layer pictures as odd numbered frames. Each base layer decoded picture is used for prediction of the next picture in the enhancement layer. The enhancement layer consists of $I^2$-pictures which do not use any temporal prediction within this layer but employ bi-directional motion compensated prediction with respect to base layer.

We can now also extend the concept of $P^1$-pictures introduced above for enhancement layer to what we call $P^2$-pictures. The $P^2$-pictures like $P^1$-pictures employ temporal prediction within the same layer. However they differ because they use motion compensated bi-directional prediction instead of unidirectional prediction from the base layer.

FIG. 14 shows such picture structures for the base and the enhancement layers; the corresponding structures are applied to the base and the enhancement layer encoders. The base layer employs M=3 structure with two B-pictures between the previous and the next reference pictures. The enhancement layer uses M=1 structure as well as bi-directional motion-compensated prediction with immediate previous and immediate following base layer pictures as reference. The first picture in enhancement layer thus is an $I^2$-picture and is followed by remaining $P^2$-pictures.

The picture arrangement of FIG. 14 can be used for migration to progressive format, 960 line, 60 Hz frame rate video and the like. A general block diagram of codecs employing this picture arrangement is shown in FIG. 2 and FIG. 7. In FIG. 2, the base layer uses progressive, 960 line, 30 Hz, obtained by selecting only the even numbered frames from 60 Hz source, the enhancement layer uses progressive 960 line, 30 Hz, obtained by selecting the odd numbered frames; the enhancement layer pictures thus occur at intermediate temporal instants of the base layer pictures. In FIG. 7, the base layer and enhancement layers both use interlaced format, 960 lines, obtained by either fixed or adaptive progressive-to-two interlace conversion from 60 Hz progressive source. The enhancement layer pictures occur at same temporal frame instants as the base layer pictures though their field order in each frame is complementary to that in base layer. For notational convenience, base layer pictures are labeled as even numbered frames and enhancement layer pictures as odd numbered frames. Each base layer decoded picture is used for prediction of the next picture in the enhancement layer. The enhancement layer consists of M=1 with $I^2$- and $P^2$-pictures. The $P^2$-pictures employ motion compensated prediction with respect to the immediately previous odd-numbered decoded picture in the enhancement layer as well as motion compensated predictions from the immediately previous and immediately next even-numbered decoded pictures in the base layer.

FIG. 15 shows picture structures for the base and the enhancement layers; the corresponding structures are applied to the base and the enhancement layer encoders. The base layer employs M=3 structure with two B-pictures between the previous and the next reference pictures. The enhancement layer uses M=3 structure as well as unidirectional motion-compensated prediction with immediate previous base layer picture as reference. Thus, for every I-, P- and B-picture in the base layer, there exists a corresponding $I^1$-, $P^1$-and $B^1$-picture in the enhancement layer.

The picture arrangement of FIG. 15 can be used for migration to progressive 960 line, 60 Hz. General block diagram of codecs employing this picture arrangement is shown in FIG. 2 and FIG. 7. In FIG. 2, the base layer uses progressive 960 line, 30 Hz, obtained by selecting only the even numbered frames from 60 Hz source, the enhancement layer uses progressive 960 line, 30 Hz, obtained by selecting the odd numbered frames; the enhancement layer pictures thus occur at intermediate temporal instants of the base layer pictures. In FIG. 7, the base layer and enhancement layers both use interlaced 960 line, obtained by either fixed or adaptive progressive-to-two interlace conversion from 60 Hz progressive source, the enhancement layer pictures occur at same temporal frame instants as the base layer pictures though their field order in each frame is complementary to that in base layer. For notational convenience, base layer pictures are labeled as even numbered frames and enhancement layer pictures as odd numbered frames. Each base layer decoded picture is used for prediction of the next picture in the enhancement layer. The enhancement layer consists of M=3 structure with first picture being $I^1$-and remaining pictures are $P^1$- or $B^1$-pictures. The $I^1$-pictures employ motion compensated prediction from base layer. The $P^1$-pictures benefit from two predictions, motion compensated prediction with respect to the previous (odd numbered) decoded picture in the same layer as well as motion compensated prediction from the immediately previous (even numbered) decoded picture in the base layer. The $B^1$-pictures benefit from three predictions, bi-directional motion compensated prediction with reference frames in the enhancement layer as well as motion compensated prediction with respect to immediately previous decoded frame of the base layer.

In FIG. 2, the base layer uses progressive 960 line, 30 Hz, obtained by selecting only the even numbered frames from 60 Hz source, the enhancement layer uses progressive 960 line, 30 Hz, obtained by selecting the odd numbered frames; the enhancement layer pictures thus occur at intermediate temporal instants of the base layer pictures. In FIG. 7, the base layer and enhancement layers both use interlaced 960 line, obtained by either fixed or adaptive progressive-to-two interlace conversion from 60 Hz progressive source. The enhancement layer pictures occur at same temporal frame instants as the base layer pictures though their field order in each frame is complementary to that in base layer. For notational convenience, base layer pictures are labeled as even numbered frames and enhancement layer pictures as odd numbered frames.

FIG. 16 shows additional examples of picture structures for the base and the enhancement layers. The corresponding structures are applied to the base and the enhancement layer encoders as in the other cases. The base layer employs M=3 structure with two B-pictures between the previous and the next reference pictures. The enhancement layer simply consists of I-pictures with no temporal prediction within the same layer but uses interlaced to progressive interpolated base layer pictures for prediction. The base layer pictures occur at half the rate of enhancement layer pictures but interpolated base layer pictures occur at the same rate as enhancement layer pictures.

The picture arrangement of FIG. 16 can be used for migration to progressive 960 line, 60 Hz. General block diagram of a codec employing this picture arrangement is shown in FIG. 7. The base layer uses interlaced 960 line, obtained by down converting the 60 Hz source from progressive to interlaced format. Each base layer decoded picture is used for prediction of two corresponding pictures in the enhancement layer. The enhancement layer consists of I-pictures only, predicted with respect to upconverted to progressive format, decoded interlaced frames from the base layer.

FIG. 17 shows yet additional picture structures for the base and the enhancement layers. The corresponding structures are also applied to the base and the enhancement layer encoders. The base layer employs M=3 structure with two B-pictures between the previous and the next reference pictures. The enhancement layer uses M=1 structure with first picture an I-picture with prediction from interlaced to progressive interpolated base layer picture, followed by P-pictures that not only use prediction from base layer used by I-picture but also motion compensated prediction within the same layer. The base layer pictures occur at half the rate of enhancement layer pictures but interpolated base layer pictures occur at the same rate as enhancement layer pictures.

The picture arrangement of FIG. 17 can be used for migration to progressive 960 line, 60 Hz. A general block diagram of a codec employing this picture arrangement is shown in FIG. 7. The base layer uses interlaced 960 line video, obtained by converting the 60 Hz source from progressive to interlaced format. Each base layer decoded picture is used for prediction of two corresponding pictures in the enhancement layer. The enhancement layer consists of M=1 structure with first picture, an I-picture, followed by all P-pictures. Both these picture types are predicted with respect to upconverted to progressive format, decoded interlaced frames from the base layer. The P-pictures however also utilize motion compensated prediction with respect to the immediate previous decoded picture within the enhancement layer.

We claim:

1. A multi-layer video encoder, comprising:

an input for receiving progressive format video signals representing a first resolution level at a predetermined first frame rate;

separating means for separating, in response to the progressive format video signals received by the input, each progressive format video signal received by the input into a first progressive format video signal and a second progressive format video signal;

base layer encoding means for producing, in response to the first progressive format video signal, a third video signal and encoded video signals in a predetermined format, at a predetermined resolution level, and at a predetermined frame rate, at least one of the format, resolution level, and frame rate of the encoded video signals being different from the format, resolution level, and frame rate of the video signals received by the input;

enhancement layer encoding means for producing, in response to the second progressive format video signal and the third video signal, encoded video signals in a predetermined format at a predetermined resolution level and at a predetermined frame rate, at least one of the format, resolution level, and frame rate of the encoded video signals produced by the enhancement layer encoding means being different from the format, resolution level, and frame rate of the encoded video signals produced by the base layer encoding means; and an output channel having a predetermined bandwidth shared by the encoded video signals produced by the base layer encoding means and the enhancement layer encoding means.

2. The multi-layer video encoder of claim 1, wherein the second progressive format video signal is the progressive format video signal received by the input.

3. The multi-layer video encoder of claim 2, wherein the separating means is a spatial decimator.

4. The multi-layer video encoder of claim 2, further comprising a spatial interpolator which inputs the third video signal and outputs a fourth video signal to the enhancement layer encoding means, wherein the enhancement layer encoding means produces the encoded video signals based on the second progressive format video signal and the fourth video signal, such that the enhancement layer encoding means produces the encoded video signals only indirectly in response to the third video signal.

5. The multi-layer video encoder of claim 1, wherein the separating means is a demultiplexer.

6. The multi-layer video encoder of claim 5, wherein the second progressive format video signal is output by the demultiplexer.

7. The multi-layer video encoder of claim 5, wherein the enhancement layer encoding means produces the encoded video signals directly in response to the third video signal.

8. A multi-layer video encoder, comprising:
- an input for receiving progressive format video signals representing a first resolution level at a predetermined first frame rate;
- separating means for separating, in response to the progressive format video signals received by the input, each progressive format video signal received by the input into a first progressive format video signal and a second progressive format video signal;
- base layer encoding means for producing, in response to the first progressive format video signal, a third video signal and progressive format encoded video signals representing a second resolution level less than the first resolution level at a predetermined second frame rate less than the first frame rate;
- enhancement layer encoding means for producing, in response to the second progressive format video signal and the third video signal, progressive format encoded video signals at the first resolution level and at the first frame rate; and
- an output channel having a predetermined bandwidth for carrying the encoded video signals produced by the base layer encoding means and the enhancement layer encoding means.

9. The multi-layer video encoder of claim 8, further comprising:
- a means for causing the encoded video signals from the base layer encoding means and the enhancement layer coding means to adaptively share the bandwidth of the output channel in response to a predetermined parameter.

10. The multi-layer video encoder of claim 8, wherein the second progressive format video signal is the progressive format video signal received by the input.

11. The multi-layer video encoder of claim 10, wherein the separating means is a spatial decimator.

12. The multi-layer video encoder of claim 10, further comprising a spatial interpolator which inputs the third video signal and outputs a fourth video signal to the enhancement layer encoding means, wherein the enhancement layer encoding means produces the progressive format encoded video signals based on the second progressive format video signal and the fourth video signal, such that the enhancement layer encoding means produces the progressive format encoded video signals only indirectly in response to the third video signal.

13. The multi-layer video encoder of claim 8, wherein the separating means is a demultiplexer.

14. The multi-layer video encoder of claim 13, wherein the second progressive format video signal is output by the demultiplexer.

15. The multi-layer video encoder of claim 13, wherein the enhancement layer encoding means produces the progressive format encoded video signals directly in response to the third video signal.

16. A multi-layer video encoder, comprising:
- an input for receiving progressive format video signals having a first resolution level and a first frame rate;
- a progressive format video signal generator that generates, in response to the progressive format video signals received by the input, at least a first progressive format video signal from each progressive format video signal received by the input;
- a base layer encoder that produces, in response to the first progressive format video signal, a video signal and encoded video signals in a predetermined format, at a predetermined resolution level, and at a predetermined frame rate, at least one of the format, resolution level, and frame rate of the encoded video signals different from the format, resolution level, and frame rate of the progressive format video signals received by the input;
- an enhancement layer encoder that produces, in response to the video signal and either the progressive format video signals received by the input or a second progressive format video signal, wherein the second progressive format video signal is generated by the progressive format video signal generator from the progressive format video signals received by the input, encoded video signals in a predetermined format at a predetermined resolution level and at a predetermined frame rate, at least one of the format, resolution level, and frame rate of the encoded video signals produced by the enhancement layer encoder different from the format, resolution level, and frame rate of the encoded video signals produced by the base layer encoder; and
- an output channel having a predetermined bandwidth shared by the encoded video signals produced by the base layer encoder and the enhancement layer encoder.

17. The multi-layer video encoder of claim 16, wherein the enhancement layer encoder generates the encoded video signals in response to the video signal and the progressive format video signals.

18. The multi-layer video encoder of claim 17, wherein the progressive format video signal generator is a spatial decimator.

19. The multi-layer video encoder of claim 17, further comprising a spatial interpolator which inputs the video signal and outputs a second video signal to the enhancement layer encoder, wherein the enhancement layer encoder produces the encoded video signals based on the progressive format video signals received by the input and the second video signal, such that the enhancement layer encoder produces the encoded video signals only indirectly in response to the video signal.

20. The multi-layer video encoder of claim 16, wherein the progressive format video signal generator generates the second progressive format video signal from each progressive format video signal received by the input, and the enhancement layer encoder generates the encoded video signals in response to the video signal and the second progressive format video signal.

21. The multi-layer video encoder of claim 20, wherein the progressive format video signal generator is a demultiplexer.

22. The multi-layer video encoder of claim 20, wherein the enhancement layer encoder produces the encoded video signals directly in response to the video signal.

23. A multi-layer video encoder, comprising:
- an input for receiving progressive format video signals representing a first resolution level at a predetermined first frame rate;
- a progressive format video signal generator that generates, in response to the progressive format video signals received by the input, at least a first progressive format video signal from each progressive format video signal received by the input;
- a base layer encoder that produces, in response to the first progressive format video signal, a video signal and progressive format encoded video signals representing a second resolution level less than the first resolution level at a predetermined second frame rate less than the first frame rate;
- an enhancement layer encoder that produces, in response to the video signal and either the progressive format video signals or a second progressive format video signal, wherein the second progressive format video signal is generated by the progressive format video signal generating means from the progressive format video signals received by the input, progressive format encoded video signals at the first resolution level and at the first frame rate; and
- an output channel having a predetermined bandwidth for carrying the encoded video signals produced by the base layer encoder and the enhancement layer encoder.

24. The multi-layer scalability video encoder of claim 23, further comprising means for causing the encoded video signals from the base layer encoder and the enhancement layer encoder to adapaptively share the bandwidth of the output channel in response to a predetermined parameter.

25. The multi-layer video encoder of claim 23, wherein the enhancement layer encoder generates the encoded video signals in response to the video signal and the progressive format video signals.

26. The multi-layer video encoder of claim 25, wherein the progressive format video signal generator is a spatial decimator.

27. The multi-layer video encoder of claim 26, further comprising a spatial interpolator which inputs the video signal and outputs a second video signal to the enhancement layer encoder, wherein the enhancement layer encoder produces the progressive format encoded video signals only indirectly in response to the video signal.

28. The multi-layer video encoder of claim 23, wherein the enhancement layer encoder produces the progressive format encoded video signals in response to the video signal and the second progressive format video signal, and wherein the progressive format video signal generator is a demultiplexer.

29. The multi-layer video encoder of claim 28, wherein the enhancement layer encoder produces the progressive format encoded video signals directly in response to the video signal.

* * * * *